US010205782B2

(12) United States Patent
Maredia et al.

(10) Patent No.: US 10,205,782 B2
(45) Date of Patent: Feb. 12, 2019

(54) LOCATION-BASED RESOURCE AVAILABILITY MANAGEMENT IN A PARTITIONED DISTRIBUTED STORAGE ENVIRONMENT

(71) Applicant: NetApp, Inc., Sunnyvale, CA (US)

(72) Inventors: Sahir Maredia, Maharashtra (IN); Martin George, Cochin (IN); Gargi Srinivas, Bangalore (IN); Sriram Popuri, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 161 days.

(21) Appl. No.: 15/142,098

(22) Filed: Apr. 29, 2016

(65) Prior Publication Data
US 2017/0318092 A1   Nov. 2, 2017

(51) Int. Cl.
| G06F 15/16 | (2006.01) |
| H04L 29/08 | (2006.01) |
| H04L 12/703 | (2013.01) |
| H04L 12/911 | (2013.01) |
| G06F 9/50 | (2006.01) |

(52) U.S. Cl.
CPC ........ H04L 67/1097 (2013.01); G06F 9/5061 (2013.01); H04L 45/28 (2013.01); H04L 47/70 (2013.01); H04L 29/08072 (2013.01)

(58) Field of Classification Search
CPC .... H04L 29/08072; H04L 29/06; H04L 45/28
USPC ........................................ 709/203, 220, 225
See application file for complete search history.

(56) References Cited

U.S. PATENT DOCUMENTS

| 6,151,688 | A  | * | 11/2000 | Wipfel ................... G06F 11/008 709/224 |
| 6,338,112 | B1 | * | 1/2002 | Wipfel ................... G06F 11/008 709/223 |
| 6,353,898 | B1 | * | 3/2002 | Wipfel ................... G06F 11/008 707/999.01 |
| 6,658,587 | B1 |   | 12/2003 | Pramanick et al. |
| 7,535,825 | B1 | * | 5/2009 | Callon ................. G06F 11/2294 370/216 |

(Continued)

OTHER PUBLICATIONS http://www.yellow-bricks.com/2009/09/29/whats-that-alua-exactly/, Sep. 29, 2009.

(Continued)

Primary Examiner — Khanh Q Dinh
(74) Attorney, Agent, or Firm — LeClairRyan PLLC

(57) ABSTRACT

In some embodiments, a cluster computing system notifies a host system that a first path to a resource in the cluster computing system is optimized and that a second path to the resource is non-optimized. The resource is owned or managed by a first computing node of the cluster computing system. The first path includes the first computing node. The second path includes a second computing node and an intra-cluster connection between the second computing node and the first computing node. A disruption in the intra-cluster connection, which prevents communication between the first and second computing nodes via the intra-cluster connection, is identified. During a time period in which the disruption exists, the host system is notified that the first path is optimized and that the second path is unavailable, and input/output operations between the host system and the resource via the first path are continued.

15 Claims, 10 Drawing Sheets

(56) References Cited

U.S. PATENT DOCUMENTS

| | | |
|---|---|---|
| 7,590,737 B1 | 9/2009 | Chen et al. |
| 7,631,066 B1 | 12/2009 | Schatz et al. |
| 7,668,082 B1 * | 2/2010 | Callon ................ G06F 11/2294 370/218 |
| 7,739,541 B1 | 6/2010 | Rao et al. |
| 7,778,157 B1 | 8/2010 | Tawri et al. |
| 7,827,441 B1 | 11/2010 | Wenzel |
| 9,542,642 B2 * | 1/2017 | Wood ....................... G06N 3/02 |
| 9,986,471 B2 * | 5/2018 | Petrick .............. H04W 36/0055 |
| 2002/0083036 A1 | 6/2002 | Price |
| 2014/0046882 A1 * | 2/2014 | Wood ....................... G06N 3/02 706/16 |
| 2014/0173330 A1 | 6/2014 | Samanta et al. |
| 2015/0117244 A1 * | 4/2015 | Williamson .......... H04L 43/045 370/252 |
| 2015/0169415 A1 * | 6/2015 | Hildebrand ........... G06F 11/201 714/4.5 |
| 2017/0161609 A1 * | 6/2017 | Wood ...................... H04L 45/08 |
| 2017/0374163 A1 * | 12/2017 | Rose ....................... H04L 67/16 |

OTHER PUBLICATIONS http://techthoughts.typepad.com/managing_computers/2007/10/split-brain-quo.html, Oct. 2007.

https://kb.netapp.com/support/index?page=content&id=3012899&pmv=print&impressions=false, Feb. 25, 2016.

http://community.netapp.com/t5/Microsoft-Cloud-and-Virtualization-Discussions/How-does-OCSR-prevent-split-brain-scenarios/td-p/51735, Aug. 29, 2011.

https://kb.netapp.com/support/index?page=content&id=2017334, Nov. 29, 2015.

European Search Report and Written Opinion of Corresponding European Patent Application No. PCT/US2017/023997, 11 pgs, dated Mar. 24, 2017.

International Preliminary Report on Patentablity for Application No. PCT/US2017/023997, dated on Nov. 8, 2018, 7 pages.

* cited by examiner

LOCATION-BASED RESOURCE AVAILABILITY MANAGEMENT IN A PARTITIONED DISTRIBUTED STORAGE ENVIRONMENT

TECHNICAL FIELD

The present disclosure relates generally to storage systems, and more specifically relates to managing the availability of resources based on their location in a distributed storage environment or other clustered computing system that has experienced a partition or other intra-cluster communication disruption.

BACKGROUND

Clustered computing systems can be used to reliably store data, host applications, and otherwise provide reliable storage. In a clustered computing system, two or more cluster nodes are connected in a distributed architecture, where the cluster nodes operate in a coordinated manner to respond to requests from host systems (e.g., end-user computing devices, external distributed computing systems, etc.). In a clustered computing system used to implement a distributed storage system, each cluster node may be a storage controller that is used to manage physical or logical storage volumes. Two or more cluster nodes are communicatively coupled to form a cluster. Each of the nodes in the cluster can communicate with the other nodes in the cluster.

A clustered architecture allows convenient scaling through the addition of more cluster nodes, which are capable of communicating with each other. In some cases, a storage cluster may present a single system image of stored data to hosts and administrators. For example, from the perspective of the host system that accesses a distributed storage area network ("SAN") environment, a given cluster may appear as a single logical unit, which can be identified by a logical unit number ("LUN"). The host system is not aware of the existence of logical sub-units of the distributed LUN (e.g., nodes in the cluster represented as the LUN). Thus, if a data operation in the SAN involves access to a particular logical sub-unit, this data operation and the actual location of the data is transparent to the host system.

However, as the number of nodes increases, maintaining a consistent single cluster configuration across the cluster nodes of the cluster becomes a challenge, since management and control operations may be performed on multiple nodes simultaneously. Thus, the consistency of the cluster configuration may be negatively impacted if communications between cluster nodes experiences intermittent failures.

For example, communication problems within a cluster can cause nodes that have lost connectivity with the rest of the cluster to become unresponsive. This can result in one or more partitions of the cluster. A partition is a condition in which not all of the nodes in a cluster can communicate with one other. For example, a node in a subset (i.e., a partition) of the nodes may only be able to communicate with other nodes in the subset. Nodes within a partition can maintain connectivity between each other. But the nodes within a first partition cannot be accessed via nodes of a second partition. This can result in a "split brain" configuration, in which one or more nodes in a cluster may operate autonomously from other nodes rather than all cluster nodes operating in a coordinated manner.

In some cases, a quorum-based fencing algorithm can be used to reduce the negative impacts associated with a split-brain configuration. For example, a "quorum" of nodes (i.e., a partition having the largest number of nodes in communication with one another) can be selected as the "active" partition. Out-of-quorum nodes can be fenced by preventing host systems or other devices from accessing resources (e.g., logical storage units) that are owned or managed by the out-of-quorum nodes. But using a quorum-based procedure for selecting an active partition may not properly account for certain in-use resources being owned or managed by an out-of-quorum node. For example, from the perspective of a host system, the fenced node whose access is blocked (i.e., the out-of-quorum node) may still have active logical interfaces that have been used by the host system to access a logical storage unit. The host system therefore expects to be able to access data from one or more logical storage unit owned by the fenced node. Thus, existing quorum-based solutions may reduce the availability of cluster-managed resources to host systems.

With respect to these and other considerations, improvements are desirable for managing the availability of resources in a distributed storage environment or other clustered computing system that has experienced a partition or other intra-cluster communication disruption.

SUMMARY

In some embodiments, a cluster computing system notifies a host system that a first path to a resource in the cluster computing system is optimized and that a second path to the resource is non-optimized. The resource is owned or managed by a first computing node of the cluster computing system. The first path includes the first computing node, and the second path includes a second computing node and an intra-cluster connection between the second computing node and the first computing node. A disruption in the intra-cluster connection is identified subsequent to the first and second paths being identified as active. The disruption prevents communication between the first computing node and the second computing node via the intra-cluster connection. During a time period in which the disruption exists, the host system is notified that the first path is optimized and that the second path is unavailable, and input/output operations between the host system and the resource via the first path are continued.

These illustrative examples are mentioned not to limit or define the disclosure, but to provide examples to aid understanding thereof. Additional embodiments and examples are discussed in the Detailed Description, and further description is provided there.

DETAILED DESCRIPTION

Figure 1:
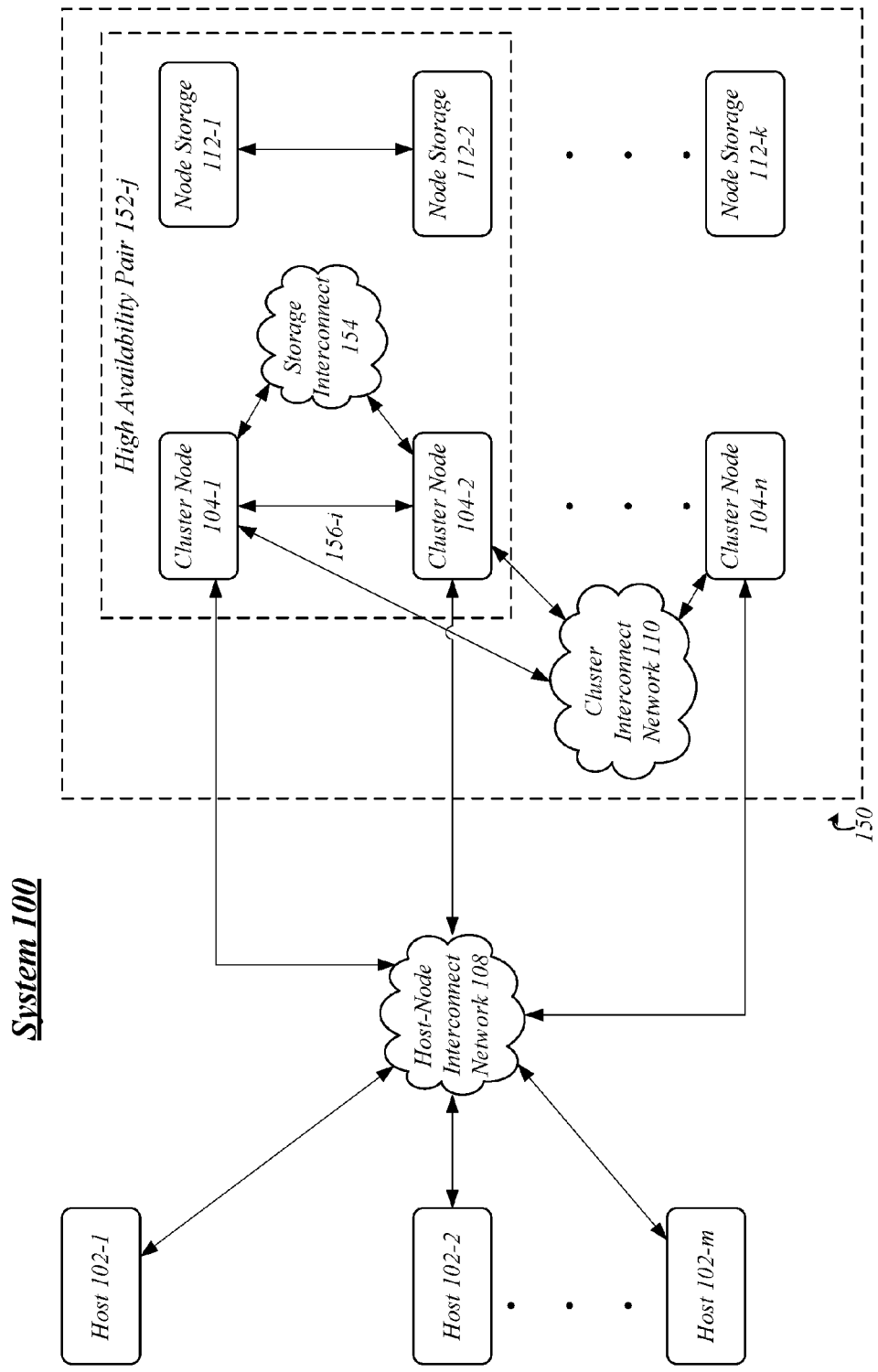
FIG. 1 illustrates an example of a cluster storage system that can manage the availability of resources based on their location in the cluster storage system, according to certain embodiments.

Systems and methods are described for managing the availability of resources based on their location in a clustered computing system (e.g., a distributed storage environment) that has experienced a partition or other intra-cluster communication disruption. For example, certain embodiments involve selecting an active partition based on the locality of one or more logical units of a distributed storage area network ("SAN") environment. Computing devices in the SAN environment can fence certain nodes (or partitions) and discourage non-local data access to these fenced nodes. Non-local data access can involve a host system accessing a resource, which is owned or managed by one node, via one or more logical paths through other nodes of the cluster. In some embodiments, the computing devices can notify, using the Asymmetric Logical Unit Access ("ALUA") protocol or other suitable protocol, host systems that paths to a fenced node through nodes of an active partition are unavailable. These notifications can prevent non-local access to a resource that is owned or managed by the fenced node. The ALUA protocol or other protocol can also be used to advertise a path through the fenced node to resources owned by the fenced node as "optimized," thereby maintaining the availability of the resources to host systems.

In some embodiments, the location-based resource management described herein can avoid or prevent a split-brain configuration of a cluster. Avoiding or preventing a split-brain configuration of a cluster can improve the correctness and consistency of configuration information (e.g., metadata about logical storage units, such as the administrative state, the reservations state, etc.) across partitions in the cluster. In additional or alternative embodiments, the location-based resource management described herein can make cluster recovery transparent and non-disruptive to host systems that may access resources controlled by an out-of-quorum node.

The following non-limiting example is provided to introduce certain embodiments. In a SAN environment, different nodes in a cluster may own or control different resources, such as a logical storage unit identified by a logical unit number ("LUN"). Nodes in the cluster can be communicatively coupled via one or more intra-cluster connections (e.g., a cluster interconnect switch, an interconnect between a high-availability pair of nodes, or any other suitable device or group of devices). One or more nodes in the cluster can identify one or more disruptions in intra-cluster communications, such as (but not limited to) connectivity failures that result in the cluster being partitioned. On an active partition (e.g., a set of nodes having a quorum), locality information for each LUN associated with the cluster is checked. The locality information is used to identify LUNs or other resources that are controlled or owned by out-of-quorum nodes to be fenced (i.e., cluster nodes that have lost connectivity to the nodes in the active partition).

In this example, nodes in the active partition implement a fencing process with respect to the out-of-quorum nodes. This fencing process involves notifying, for each node in the active partition, host systems that indirect paths to an out-of-quorum node are unavailable. These indirect paths include paths from the active partition to a resource owned or managed by the out-of-quorum node. Access to the fenced node can be blocked without bringing the node down completely. For instance, the ALUA state of a path to the node can be changed from an "active/non-optimized" state to an "unavailable" state. For the nodes in the active partition that cannot reach the LUN of the fenced node, the fencing process can also include aborting ongoing input/output ("I/O") operations involving the LUN. The path to the LUN through the fenced node, however, can be advertised as available (e.g., by maintaining the ALUA state of "active optimized"). In this manner, the LUN can remain available to host systems, but the host systems can be prevented from modifying configuration information (e.g., metadata) regarding the LUN that is controlled by the fenced node. This can reduce the impact of inconsistencies in configuration information between the fenced node and the active partition.

In some embodiments, a subset of available commands (e.g., SCSI commands) can be maintained for the "unavailable" paths to the fenced node. For example, commands that are deemed essential (e.g., commands that are not media-access commands) for avoiding disruption to operations by host systems can be permitted with respect to the unavailable paths (e.g., in the event that the host systems probe these paths). Other, non-essential commands involving the unavailable paths (e.g., media access commands) are returned to the host system with a protocol error (e.g., a message that the path is "Not Ready—Unavailable"). Most host systems will communicate I/O operations on active optimized paths and will not transmit any I/O commands using unavailable paths. If a host system transmits I/O commands via an unavailable path, the host system will receive an error in respond to the transmitted I/O command (e.g. a "Check condition" message in the SCSI protocol).

In some embodiments, the fencing technique described above can address split brain behavior in partitioned clusters. Furthermore, in certain scenarios in which a LUN-owning node is not initialized promptly, the nodes in the cluster can enter fenced state of operations described above. After the LUN-owning node comes online and the LUNs can be initialized, normal operations can be resumed. This can allow LUNs to be mapped without waiting for the LUN-owning node to be initialized, which can reduce boot-up time for the cluster, avoiding disruptions to host systems, or both.

Reference is now made to the drawings, in which like reference numerals are used to refer to like elements. In the following description, for purposes of explanation, numerous specific details are set forth in order to provide a thorough understanding thereof. However, embodiments described herein can be practiced without these specific details. In other instances, certain structures and devices are shown in block diagram form in order to facilitate a description thereof. These drawings encompass various modifications, equivalents, and alternatives consistent with the claimed subject matter.

FIG. 1 illustrates a block diagram for a distributed storage environment 100 having a cluster 150. The cluster 150 can include cluster nodes 104-1 to 104-n. The cluster nodes 104-1 to 104-n can communicate with one or more hosts 102-1 to 102-m via a host-node interconnect network 108. The communication can be implemented in any suitable manner (e.g., in a client-server fashion or in a peer-to-peer fashion). The host-node interconnect network 108 can include one or more network devices (e.g., hubs, switches, routers, etc.) communicatively coupled to one or more network interface cards ("NIC") or host bus adapters ("HBA"), which may be included in or communicatively coupled to the hosts. The host-node interconnect network 108 can also include one or more physical network ports (e.g., an Ethernet port on a NIC) included in or communicatively coupled to the cluster nodes 104-1 to 104-n.

The cluster nodes may communicate with node storages 112-1 to 112-k via a storage interconnect 154. The node storages 112-1 to 112-k may include, without limitation, one or more storage units. The storage units may be logical abstractions of various data containers such as, for example, aggregates, volumes, LUNs, or any other data structure configured to store information. Each pair of cluster nodes may communicate with a pair of node storages 112-1, 112-2 via storage interconnect 154.

Each pair of cluster nodes may also communicate with each other via high-availability interconnect 156-i to form a high-availability pair 152-j. In a high-availability pair, if one cluster node (i.e., a high availability partner cluster node) in the high-availability pair becomes communicatively inaccessible or not operational, the other cluster node may take ownership and management of data stored in both node storages 112-1 and 112-2. Combinations of cluster nodes 104 and node storages 112 may vary with a given implementation in order to provide redundancy and meet a client's need for availability and reliability.

In some embodiments, the hosts 102-1 to 102-m may be implemented as one or more servers or other computing devices that are communicatively coupled to the cluster nodes 104-1 to 104-n. The hosts 102-1 to 102-m can store, retrieve, and modify their associated data stored in the node storages 112-1 to 112-k. In some embodiments, the cluster nodes 104 may be implemented as one or more storage controllers executing one or more storage operating systems communicatively coupled to one or more node storages 112.

In some embodiments, the hosts 102-1 to 102-m, the cluster nodes 104-1 to 104-n, or the node storage 112-1 to 112-k may each include one or more components. As used herein, the terms "system" and "application" and "component" are intended to refer to a computer-related entity, which can include hardware, a combination of hardware and software, software, or software in execution. For example, a component can be implemented as a process running on a processor, a processor, a hard disk drive, multiple storage drives (of optical or magnetic storage medium), an object, an executable, a thread of execution, a program, or a computer. By way of illustration, both an operating system running on a host, cluster node, or node storage and the host, cluster node, or node storage themselves can be a component. One or more components can reside within a process or thread of execution, and a component can be localized on one computer or distributed between two or more computers as desired for a given implementation. The embodiments are not limited in this context.

In some embodiments, components may be communicatively coupled via various types of communications media and may coordinate operations between each other. The coordination may involve the uni-directional or bi-directional exchange of information. The components may communicate via one or more interfaces, such as application program interfaces or local or remote procedural mechanisms across one or more hardware or software boundaries. Additionally, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, network interfaces, and bus interfaces.

In order to provide one or more of fault tolerance, load balancing, and maintenance of consistency of shared resources or states among the cluster nodes 104-1 to 104-n, the cluster nodes 104-1 to 104-n may also communicate with each other via cluster interconnect 110. To facilitate communication between the cluster nodes 104, the cluster interconnect 110 can include one or more network components (e.g., hubs, switches, routers, etc.) communicatively coupled to the cluster nodes 104-1 to 104-n.

Although a distributed storage environment 100 shown in FIG. 1 has a limited number of elements in a certain topology, a distributed storage environment 100 may include different numbers of elements in alternate topologies as desired for a given implementation. In the example shown in FIG. 1, the hosts 102-1 to 102-m, the cluster nodes, and the node storages 112-1 to 112-k may be electronic devices of same or different types. An electronic device may include any electronic device capable of receiving, processing, storing, or sending data for the cluster storage system. Examples of an electronic device may include a mobile device, a mobile computing device, a smart phone, a desktop computer, a laptop computer, a notebook computer, a netbook computer, a handheld computer, a tablet computer, a server, a server array or server farm, a web server, a network server, etc. The embodiments are not limited in this context.

Figure 2:
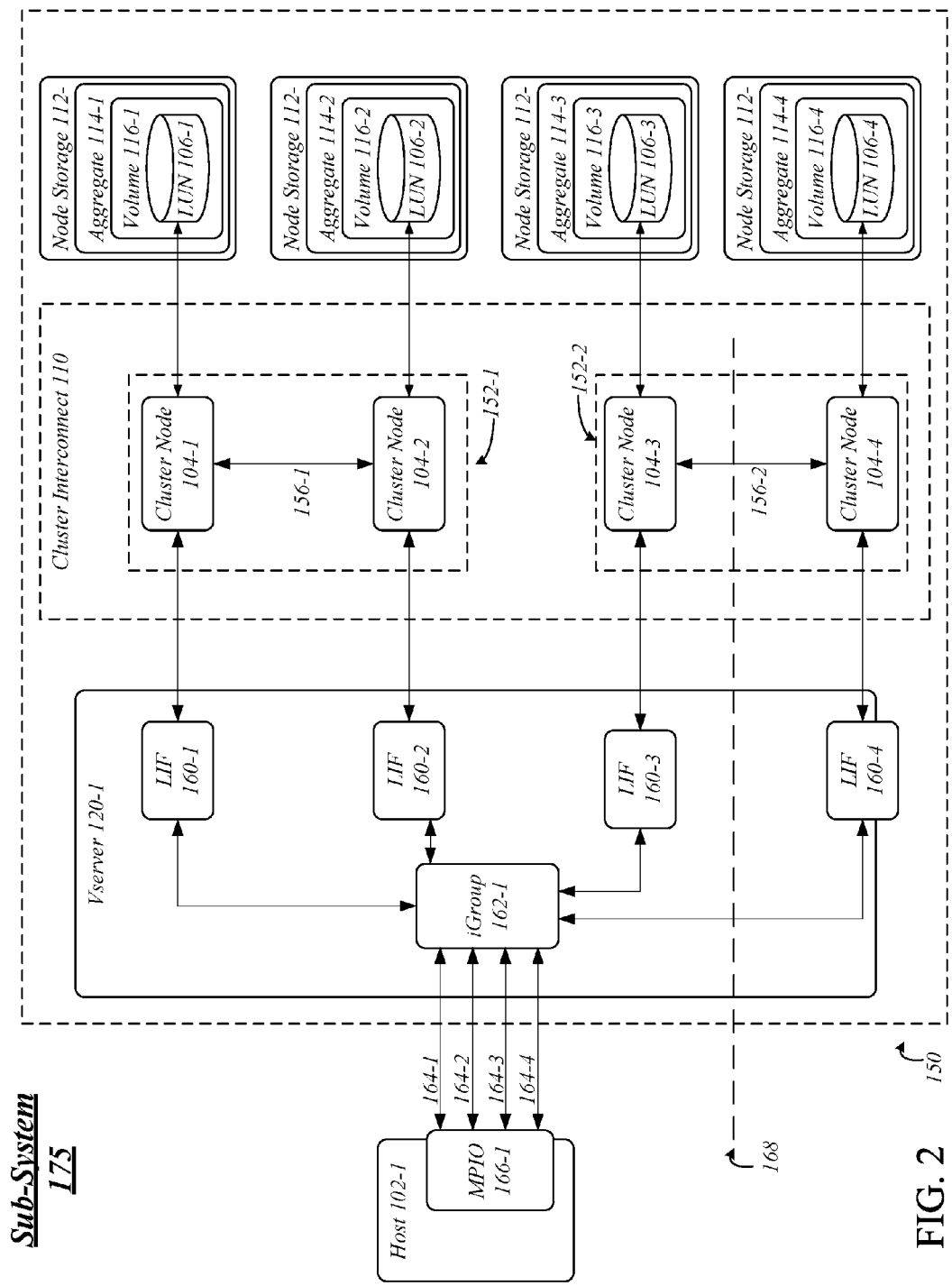
FIG. 2 illustrates an example of a subs-system from the cluster storage system depicted in FIG. 1 having a cluster that can manage the availability of resources based on their location, according to certain embodiments.

FIG. 2 illustrates a block diagram for a cluster storage sub-system 175 having four cluster nodes 104-1, 104-2, 104-3, and 104-4. In FIG. 2, each cluster node hosts or manages storage units such as, for example, logical units identified by logical unit numbers ("LUNs") 106-1, 106-2, 106-3, and 106-4, respectively. The LUNs 106-1, 106-2, 106-3, and 106-4, may be stored in volumes 116-1, 116-2, 116-3, and 116-4. The volumes 116-1, 116-2, 116-3, and 116-4 can be further stored in aggregates 114-1, 114-2, 114-3, and 114-4, respectively. Although FIG. 2 illustrates a single aggregate, volume, or LUN in each node storage, each node storage may include one or more aggregates and each aggregate may include one or more volumes and each volume may include one or more LUNs.

In some embodiments, one or more of the storage devices depicted in FIG. 2 can be configured as an array. An array of storage devices can include, for example, hard drives, flash drives, or some combination thereof.

The pair of cluster nodes 104-1 and 104-2 and the pair of cluster nodes 104-3 and 104-4 may communicate with each other via high-availability interconnects 156-1 and 156-2, respectively, to form high-availability pairs 152-1 and 152-2. If one cluster node (e.g., cluster node 104-4) in the high-availability pair becomes communicatively inaccessible or not operational, the other cluster node (e.g., cluster node 104-3) may take ownership and management of data stored in both node storages (e.g., node storages 112-3 and 112-4). Each of the four cluster nodes 104-1, 104-2, 104-3, and 104-4 may also be associated with logical interfaces ("LIFs") 160-1, 160-2, 160-3, and 160-4, respectively.

The hosts 102 may access the storage units via the LIFs 160-1, 160-2, 160-3, and 160-4 using one or more suitable protocols. Examples of suitable protocols include Small Computer System Interface ("SCSI"), Internet Small Computer System Interface ("iSCSI"), Fibre Channel Protocol ("FCP"), and Fibre Channel over Ethernet ("FCoE"). The LIFs 160-1, 160-2, 160-3, and 160-4 can be arranged as logical abstractions of physical or virtual ports included in or communicatively coupled to each of the four cluster nodes. The LIFs 160-1, 160-2, 160-3, and 160-4 can provide network access points for the four cluster nodes 104-1, 104-2, 104-3, and 104-4. For example, each of the LIFs 160-1, 160-2, 160-3, or 160-4 may correspond to an Internet Protocol ("IP") address and may be mapped to a physical network port (e.g., Ethernet port on a NIC or HBA) included in or communicatively coupled to each of the four cluster nodes 104-1, 104-2, 104-3, and 104-4.

The LIFs 160 may be further associated with a virtual storage element such as virtual storage server ("Vserver") 120-1. The Vserver 120-1 can be hosted or managed as a distributed interface for access by host 102-1 via one or more NICs or HBAs included in or communicatively coupled to the host 102-1. Each virtual storage element may also include at least one initiator group ("iGroup") such as, for example, iGroup 162-1. An iGroup may include a collection of unique identifiers to identify which initiators (e.g., NICs or HBAs) included in or communicatively coupled to hosts 102-1 to 102-m may have access to one or more distributed targets such as, for example, LUNs 106-1, 106-2, 106-3, and 106-4. The iGroup 162-1 may further be mapped to the LUNs 106-1, 106-2, 106-3, and 106-4, to provide a host with access to the LUNs 106-1, 106-2, 106-3, and 106-4 via the LIFs 160-1, 160-2, 160-3, and 160-4. In some embodiments, a cluster node may be associated or involved with a virtual storage element (e.g., Vserver 120-1) if the virtual storage element includes a LIF hosted or managed by that cluster node. In additional or alternative embodiments, a cluster node may be associated or involved with a virtual storage element if a LUN hosted, owned, or managed by that cluster node is mapped to an iGroup in that virtual storage element.

In order to provide increased fault tolerance to hardware or software failures between hosts and cluster nodes 104, the host 102-1 may further include redundant software or hardware components. The components can include, for example, one or more NICs or HBAs using Multipath I/O ("MPIO") component 166-1. The component 166-1 can provide a host 102-1 with connectivity to the cluster nodes 104-1, 104-2, 104-3, and 104-4, via one or more network paths 164-1, 164-2, 164-3, and 164-4 to access the LUNs 106-1, 106-2, 106-3, and 106-4 managed by the cluster nodes. In instances where multiple network paths (e.g., network paths 164-1, 164-2, 164-3, and 164-4) may be available to a single logical unit (e.g., LUN 106-1), the logical unit, from the perspective of the host 102-1 using MPIO component 166-1, may appear as a single virtual disk accessible by the host 102-1 for read and write operations, even though multiple network paths may be available to host 102-1.

To ensure that the host 102-1 uses optimized network paths 164 to access the storage units (e.g., LUNs 106 storing their data), the cluster nodes 104 may provide one or more updates regarding the access states for each of the network paths 164-1, 164-2, 164-3, and 164-4. For example, to access the LUN 106-1, the host 102-1 can use MPIO component 166-1 to communicate with LUN 106-1 via network paths 164-1, 164-2, 164-3, 164-4 and LIFs 160-1, 160-2, 160-3, 160-4. Generally, a direct path, which is also the active/optimized ("A/O") path, to a LUN 106-1 is through cluster node 104-1 via LIF 160-1. This path is the A/O path because the LUN 106-1 is hosted, owned, or managed by cluster node 104-1 and stored in a node storage 112-1 that is operatively connected to the cluster node 104-1.

If a network path becomes unavailable, a host may also access the LUN 106-1 through other active/not-optimized ("A/NO") paths. For example, the host 102-1 may access the LUN 106-1 through cluster nodes 104-2 and 104-3 via LIF 160-2 and LIF 160-3, respectively. To provide access to the LUN 106-1 to host 102-1 via LIFs 160-2 and 160-3, the cluster node 104-2 or 104-3 may communicate with cluster node 104-1 through cluster interconnect 110 to provide host 102-1 access to LUN 106-1 via LIFs 160-2 or 160-3.

Due to the possibility of software or hardware failures in the cluster interconnect 110, the cluster nodes 104-1, 104-2, 104-3, and 104-4, can notify the host 102-1 as these events are detected. For example, the cluster nodes 104-1, 104-2, 104-3, and 104-4, may implement the ALUA multi-pathing protocol to notify the host 102-1 regarding which paths are classified as A/O, A/NO, unavailable, or not reported for access with respect to one or more LUNs 106 in the cluster 150. The ALUA multi-pathing protocol may also enable the host 102-1 to access the LUNs 106 via MPIO component 166-1 using the fastest paths (i.e., A/O paths) if available, and one or more slower paths (i.e., A/NO paths) if no optimized paths are available for a LUN.

For ALUA access states that are unavailable or not reported, the LUNs may be inaccessible from the LIFs associated with unavailable unreported ALUA access states. In some embodiments, LIFs associated with an unavailable ALUA access state for a LUN may also not be reported to the host 102-1, such that the LUN is inaccessible from those LIFs.

An example of a software or hardware failure, which can create a disruption in intra-cluster communication, is a network failure involving a cluster interconnect 110 between one or more cluster nodes. Such an interconnect failure 168 is depicted in FIG. 2. The interconnect failure 168 may separate cluster nodes 104-1, 104-2, 104-3, and 104-4 into two or more partitions.

A partition can include cluster nodes in a cluster 150 that can communicate with each other. However, even though the cluster nodes 104 may communicate with each other, quorum may be required in order to make administrative modifications to the cluster 150. Thus, in order to ensure that administrative modifications may continue for a cluster 150 even when cluster nodes are separated into different partitions due to the interconnect failure 168, the cluster nodes 104 can first determine whether there is quorum in the cluster 150.

An interconnect failure 168 as a result of a software or hardware fault is merely one example of a partition event. Other occurrences that may result in the logical or physical disconnection between cluster nodes 104, such as, for example, software or hardware maintenance events, may also constitute a partition event and as such, separate the cluster into two or more partitions. The examples are not limited in this context.

A quorum may be generally established if the number of communicatively coupled cluster nodes in one partition is greater than the number of communicatively coupled cluster nodes in another partition. For example, if the interconnect failure 168 occurs, the cluster 150 may be separated into a first partition and second partition. The first partition can include cluster nodes 104-1, 104-2, and 104-3. The second partition can include cluster node 104-4. The cluster nodes in the first partition may determine that the number of communicatively accessible (i.e., capable of communication and as such, "in partition") cluster nodes is three (i.e., cluster nodes 104-1, 104-2, and 104-3) out of a total of four cluster nodes in the cluster 150. The cluster nodes in the first partition may also determine that the number of communicatively inaccessible (i.e., "out of partition") cluster nodes is one (i.e., cluster node 104-4) out of a total of four cluster nodes in the cluster 150. The cluster nodes 104-1, 104-2, and 104-3 may determine that the cluster 150 has a quorum because the number of communicatively accessible cluster nodes is greater than the number of communicatively inaccessible cluster nodes.

In some embodiments, if a number of communicatively accessible cluster nodes is equal to number of communicatively inaccessible cluster nodes 104 in the cluster 150, a cluster node holding epsilon, a tie breaking element, may be used to determine which partition maintains quorum. As such, a cluster node holding epsilon may add an extra vote to a partition including that cluster node, such that quorum may be maintained in the partition. A partition maintaining the quorum is the majority (or active) partition and the remaining partitions can include one or more minority partitions. Thus, whether a partition is a majority partition or a minority partition may be determined based at least partially on whether the number of communicatively accessible cluster nodes 104 in that partition is equal to or greater N/2+1, where "N" is the total number of cluster nodes in the cluster 150. If the number of cluster nodes within a partition is equal to or less than N/2, then the cluster nodes 104 are within a minority partition.

Figure 3:
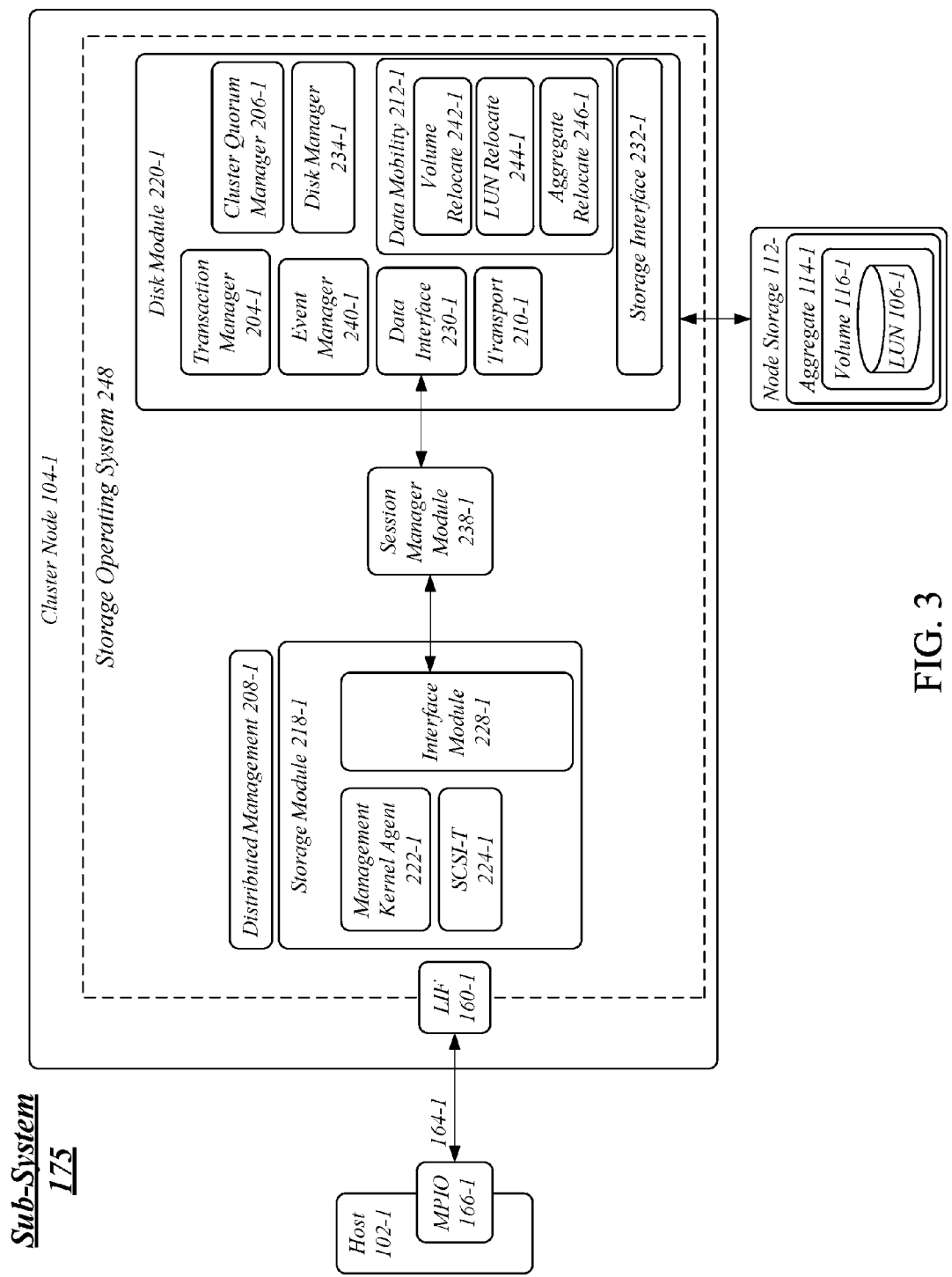
FIG. 3 illustrates an example of a cluster node from the clusters depicted in FIGS. 1 and 2, according to certain embodiments.

FIG. 3 illustrates an example of a cluster node 104-1. The cluster node 104-1 can perform one or more operations in a quorum-based algorithm. For example, the cluster node 104-1 can determine if the cluster is separated into one or more partitions, notify one or more cluster nodes to separate into one or more partitions, remove one or more group members from one or more groups, update one or more access states associated with one or more network paths between a host and one or more storage units, notify the host that access states of one or more network paths for the local logical units has been updated, provide the access states for the non-local logical units to hosts.

The cluster node 104-1 can execute a storage operating system 248-1. An example of a storage operating system 248-1 is DATA ONTAP® from NetApp, Inc. The storage operating system 248-1 can include, among other components, a distributed management component 208-1, one or more storage modules 218-1 (e.g., a SCSI module), one or more disk modules 220-1, and a session manager component 238-1.

The distributed management component 208-1 can provide and update information among cluster nodes 104-1 to 104-*n*. The distributed management component 208-1 can provide and update cached configuration information to the management kernel agent 222-1 or any other component. Examples of cached configuration information may include, without limitation cached Vserver configuration information, cached volume configuration information, cached logical unit configuration information, initiator-to-LUN maps that maps initiators to LUNs 106, and iGroup information associating groups of initiators with hosts. The distributed management component 208-1 can also provide a management gateway via one or more cluster management LIFs (not shown). The management gateway can allow cluster administrators to perform management functions such as, for example, security, access control, and auditing functions.

The distributed management component 208-1 can also store and provide volume location information. Examples of volume location information include, without limitation, a list of volumes hosted, owned, or managed by each cluster node in the cluster 150 and a volume-to-disk module map. This information can allow a storage module 218-1 to determine and communicate with an appropriate disk module 220-1 that owns or manages the volume storing a host 102-1's data or information.

The distributed management component 208-1 can also store and provide LIF configuration information. An example of LIF configuration information is a LIF-to-storage module component map, which allows a distributed management component 208-1 to determine which storage module is currently hosting or managing the associated LIF. The distributed management component 208-1 can also store and provide Vserver information. Examples of Vserver information include a list of Vservers (including associated Vserver identifiers), one or more cluster management LIFs, or any other information cached by management kernel agent 222-1 that is not specific to the SAN subsystem of cluster 150. In some embodiments, the distributed management component 208-1 can communicate with other distributed management components in other cluster nodes (e.g., cluster node 104-2). This can allow the distributed management component 208-1 to persistently track and to provide, via one or more user interfaces communicatively coupled to the distributed management component 208-1, the cluster state information of the cluster nodes in cluster 150 to the cluster administrators.

In some embodiments, the cluster state information may include, without limitation, the partitions currently in the cluster 150, the cluster nodes 104 in each partition, whether a cluster node is in the majority or a minority partition, the event triggering a cluster node to be in the minority partition, or any other information that may indicate the status or state of the cluster 150 to the cluster administrators. The cluster state information may be provided to a cluster administrator via one or more user interfaces (not shown) communicatively coupled to the distributed management component 208-1.

In some embodiments, the distributed management component 208-1 can also communicate with other distributed management components in other cluster nodes to persistently track transaction information associated with the transaction manager 204-1. Information associated with the transaction manager 204-1 can include one or more modifications to a resource in the cluster 150. The transaction information may include, without limitation, a transaction identifier, transaction type (e.g., voting proposal transaction, informative proposal transaction, etc.), the result of the transaction, whether the transaction was committed, discarded, or failed, reasons why transaction was discarded or failed, and any other information regarding the status of a transaction, including the last committed transaction.

The storage module 218-1 can provide access, by one or more hosts 102-1 to 102-*m* access, to the storage units (e.g., LUN 106-1) managed by the cluster node 104-1. This access can be provided by communicating, via the session manager component 238-1, with the respective disk module 220-1 hosting, owning, or managing the appropriate LUN 106.

In some embodiments, the storage module 218-1 may include, among other components, a SCSI-Target ("SCSI-T") component 224-1, a management kernel agent 222-1, and an interface module 228-1. The SCSI-T component 224-1 can interface with a host 102-1 by using, for example, the SCSI Target Device Object disclosed in the SCSI Architecture Model from Technical Committee T10 of the Internal Committee for Information Technology Standards. The SCSI-T component 224-1 can, in conjunction with the transport component 210-1, provide SCSI-Target services to SCSI initiators, such as initiators included in or communicatively coupled to host 102-1 and management of one or more SCSI-Ports. SCSI-Ports are logical representations of a host connected to a cluster node to access one or more storage units (e.g., LUNs 106).

To provide hosts 102-1 to 102-m with access to their data stored in storage units (e.g., LUNs 106), the SCSI-T component 224-1 can also interface with one or more disk modules 220 (e.g., disk module 220-1) via the Session Manager component 238-1. The SCSI-T component 224-1 can also determine, for a given initiator included in or communicatively coupled to hosts 102, which logical units the initiator can access and at which LUN. The SCSI-T component 224-1 can make this determination based at least partially on the cached configuration information (e.g., cached logical unit configuration information provided or updated by the management kernel agent 222-1).

In some embodiments, the SCSI-T component 224-1 can prevent access to a resource to protect data integrity of the resource (i.e., fence the resource). In some embodiments, a fencing operation can prevent data corruption during data mobility events associated with data mobility component 212-1. An example of data mobility event is the relocation of a LUN 106-1 managed by cluster node 104-1 to a different cluster node such as, for example, cluster node 104-2. Resources may include, without limitation, virtual storage elements (e.g., Vserver 120-1), LIFs (e.g., LIF 160-1), storage units such as, for example, aggregates, volumes, LUNs, or any other resources that may be shared or distributed between or among cluster nodes 104-1 to 104-n.

The SCSI-T component 224-1 can also determine or update the ALUA access states for one or more LUNs 106. The SCSI-T component 224-1 can do so by notifying a host regarding a path state change. The SCSI-T component 224-1 can also determine or update ALUA access states in response to joining one or more distributed logical unit groups during an interconnect recovery or data mobility event. The SCSI-T component 224-1 may also determine or update ALUA access states in response to leaving one or more distributed logical unit groups during a interconnect failure or data mobility event.

The SCSI-T component 224-1 may determine or update the ALUA access states based on any suitable information. Examples of suitable information include the quorum status information provided by the cluster quorum manager 206-1 via the event manager 240-1, the volume access state information provided by management kernel agent 222-1, and cached volume location information provided by the interface module 228-1.

The quorum status information may include, without limitation, quorum state information, connectivity state information, or operational state information. For example, the quorum state information may include information regarding whether the cluster node is in-quorum or out-of-quorum. The connectivity state information may include, without limitation, information regarding whether the cluster node is "in partition" (i.e., available) or "out of partition" (i.e., unavailable). The operational state information, which may include, without limitation, information regarding whether the cluster node is whether the node is "up" (i.e., operational), "down" (i.e., not operational), or unknown (i.e., partner cluster node is unreachable).

The volume access state information may include, without limitation, a list of volumes in the cluster 150 and volume availability information for each volume included in the list of volumes. The volume availability information may indicate whether each volume in the list of volumes is "available" (i.e., volume is online and accessible within a partition) or "unavailable" (i.e., volume is offline or inaccessible within a partition) to a cluster node.

The cached volume location information may include a list of volumes that are hosted, owned, or managed by each cluster node in a cluster 150 or volume-to-disk-module map. The volume-to-disk-module map may indicate which disk module 220 of the cluster nodes may host, own, or manage particular volumes of the volumes 116.

In some embodiments, the SCSI-T component 224-1 can report or indicate the ALUA access state for a local path for a LUN (e.g., LUN 106-1) as the A/O path. Moreover, a local path is a network path to access a LUN (e.g., LUN 106-1) through a LIF where a disk module (e.g., disk module 220-1) of a cluster node hosts, owns, or manages both the LIF (i.e., a local LIF) and the LUN (i.e., a local LUN). For example, a path to access the LUN 106-1 via LIF 160-1 where both the LUN 106-1 and LIF 160-1 are hosted, owned, or managed by cluster node 104-1 may be considered a local path. In some embodiments, the SCSI-T component 224-1 can report or indicate the ALUA access state for all remote paths or non-local paths as the A/NO path. Moreover, a remote or non-local path is a path through a LIF to access a LUN (e.g., LUNs 106-2, 106-3, and 106-3) where the LIF is not hosted, owned, or managed by the same disk module (e.g., disk module 220-1) of the same cluster node as the LUN. For example, a path to access the LUN 106-4 that is hosted, owned, or managed by disk module (not shown) of cluster node 104-4 via LIFs 160-1, 160-2, and 160-3 that are hosted, owned, or managed by cluster nodes 104-1, 104-2, and 104-3, respectively, may be considered remote or non-local paths.

In some embodiments, the SCSI-T component 224-1 of cluster node 104-1 can report or indicate the ALUA access state for a non-local or remote path through a remote LIF (e.g., LIF 160-3) for a LUN (e.g., LUN 106-3) as an unavailable path. A path can be identified as an unavailable path if the operational state information for the cluster node (e.g., cluster node 104-3) hosting, owning, or managing that LUN indicates that the cluster node is "down" (i.e., not operational). Additionally or alternatively, a path can be identified as an unavailable path if the operational state information for the cluster node hosting, owning, or managing that LUN is "up" and the volume access state information indicates that the volume that includes that LUN is "unavailable."

To determine ALUA access states and report the ALUA access states, the SCSI-T component 224-1 may use the cached volume location information to determine which particular volumes of the volumes (e.g., volumes 116-1, 116-2, 116-3, and 116-4) are hosted, owned, or managed by the cluster node 104-1 (i.e., local volumes) and which particular volumes of the volumes are not hosted, owned, or managed the cluster node 104-1 (i.e., non-local or remote volumes). Furthermore, the SCSI-T component 224-1 may also use the access state information to determine whether a cluster node is "up" or "down." The SCSI-T component 224-1 may optionally use the volume access state information to determine whether a volume is "available" or "unavailable."

In some embodiments, and from the perspective of the SCSI-T component 224-1 of cluster node 104-1, the ALUA access state for a local path may be identified as an A/O path if the following conditions exist: connectivity state information indicates that a cluster node (e.g., cluster node 104-4) is "in partition"; operational state information indicates that the cluster node is "up"; the cached volume location information indicates that a volume managed by that cluster node is local (i.e., volume 116-1 managed by cluster node 104-1) to cluster node 104-1; and the volume access state information indicates that the local volume (e.g., volume 116-1) is "available." Additionally, the ALUA access state for one or more remote paths to access one or more LUNs (e.g., LUN 106-1) within the local volume (e.g., volume 116-1) via one or more LIFs remote to the cluster node 104-1 (e.g., LIFs 160-2, 160-3, and 160-4) may be identified as an A/NO path.

Continuing with the above example, and from the perspective of SCSI-T component 224-1 of cluster node 104-1, the ALUA access state for a remote path to access one or more LUNs may be identified as an A/NO path if the following conditions exist: the connectivity state information indicates that a cluster node (e.g., cluster node 104-4) is "in partition"; the cached volume location information indicates that a volume managed by that cluster node is remote or non-local (i.e., volume 116-4 managed by cluster node 104-4) to the cluster node 104-1; and the volume access state information indicates that the remote volume is "available." Still continuing with the above example and from the perspective of SCSI-T component 224-1 of cluster node 104-1, if connectivity state information indicates that a cluster node (e.g., cluster node 104-3) is "out of partition" and the operational state information indicates that the cluster node (e.g., cluster node 104-3) is "down," then the ALUA access state for a remote path to access one or more LUNs (e.g., LUN 106-1) within a volume (e.g., volume 116-1) local to the cluster node 104-1 via a LIF remote to the cluster node 104-1 may be identified as an unavailable path.

Additionally or alternatively, the ALUA access state for any path to one or more LUNs (e.g., LUN 106-3) within a volume is "unavailable" if certain conditions exist. These conditions can include, for example, connectivity state information indicating that a cluster node (e.g., cluster node 104-3) is "in partition," the operational state information indicates that the cluster node is "up" (e.g., cluster node 104-3), and the volume access state information indicates that a volume (e.g., volume 116-3) local to that cluster node (e.g., cluster node 104-3) is "unavailable."

The management kernel agent 222-1 can provide one or more components of the storage module 218-1 with cached configuration information, which may include, without limitation, cached volume configuration information and cached Vserver configuration information. The management kernel agent 222-1 can also manage data received from distributed management component 208-1.

In some embodiments, the management kernel agent 222-1 can prevent changes to a virtual storage element (e.g., a Vserver) if the virtual storage element is split between two partitions. Thus, if a virtual storage element includes or is associated with two LIFs, where each LIF is hosted by each cluster node in a different partition, then the management kernel agent 222-1 may prevent changes to the virtual storage element.

For example and with reference to FIG. 2, the management kernel agent 222-1 may prevent a cluster administrator operatively connected to distributed management component 208-1 of the cluster node 104-1 from modifying the Vserver configuration information associated with Vserver 120-1. This modification may be prevented if the interconnect failure 168 splits the cluster 150 into a majority partition containing the cluster nodes 104-1, 104-2, and 104-3 and a minority partition containing cluster node 104-4. However, if a virtual storage element includes all LIFs which are hosted by cluster nodes in a single partition and the cluster nodes are in-quorum (e.g., majority partition), the management kernel agent 222-1 can allow modifications to configuration information (e.g., Vserver configuration information) associated with the virtual storage element. Additionally or alternatively, if a virtual storage element includes all LIFs that are hosted by cluster nodes in a single partition, and the cluster nodes are out-of-quorum (e.g., minority partition), the management kernel agent 222-1 can disallow modifications to the configuration information (e.g., Vserver configuration information) associated with the virtual storage element.

In some embodiments, the management kernel agent 222-1 can store, provide, or update volume access state information that includes a list of volumes in the cluster 150 and volume availability information for each volume included in the list of volumes. It may be appreciated that, in some implementations, the list of volumes for the cluster 150 may be further restricted to include only volumes 116 that include at least one LUN (e.g., LUN 106-1) that is mapped to an iGroup (e.g., iGroup 162-1) of a Vserver (e.g., Vserver 120-1) (i.e., a mapped LUN).

In some embodiments, the management kernel agent 222-1 can update the volume access state information if cluster nodes hosting, owning, or managing one or more storage units (e.g., aggregates 114 or volumes 116) becomes separated from a partition the cluster node 104-1 is in due to a partition event (e.g., an interconnect failure 168). For example, the management kernel agent 222-1 of cluster node 104-1 in a majority partition may update the volume availability information for volume 116-4 to "unavailable," when cluster node 104-4 hosting, owning, or managing the volume 116 transitions from the majority partition to a separate minority partition due to interconnect failure 168. Stated differently, when a cluster node (e.g., cluster node 104-4) hosting, owning, or managing a volume (e.g., volume 116-4) transitions or moves outside of an accessing partition, the management kernel agent (e.g., management kernel agent 222-1) of a cluster node in the accessing partition (e.g., the majority partition) may update the volume availability information for volume 116-4 to "unavailable" in the accessing partition (e.g., the majority partition).

To protect data integrity during a data mobility event, the management kernel agent 222-1, in some embodiments, can receive one or more notifications regarding the beginning or completion of a data mobility event from the disk manager 234-1, when the cluster node 104-1 is the source cluster node. Additionally, the management kernel agent 222-1 can receive pre-relocation or post-relocation information from the disk manager component 234-1 and notify the other cluster nodes 104 in the same partition as cluster node 104-1 the beginning or completion of a data mobility event and the received relocation information. The pre-relocation or post-relocation information may include, without limitation, a list of storage units (e.g., aggregates, volumes, or LUNs) that are currently being moved or has been moved, as a result of the data mobility event, an unique identifier associated with the disk module (e.g., disk module 220-3 (not shown)) of a source cluster node (e.g., cluster node 104-3), and an unique identifier associated with the disk module (e.g., disk module 220-4 (not shown)) of a destination cluster node (e.g., cluster node 104-4).

The interface module 228-1 can provide SCSI target data I/O and SCSI logical unit metadata functions. The interface module 228-1 may also be arranged to interface with the disk module 220-1 or other disk modules 220 in other cluster nodes 104 via one or more intra-process or inter-process communication mechanisms such as, for example, SpinNP protocol.

In some embodiments, the interface module 228-1 can interface and communicate with SCSI-T components (e.g., SCSI-T component 224-1) and notify the SCSI-T components to fence access to one or more storage units (e.g., LUNs 106) hosted, owned, or managed by cluster nodes located in a different partition than cluster node 104-1 in order to protect data integrity of the data stored in the storage units (e.g., LUNs 106).

In some embodiments, the interface module 228-1 can also store, update, or provide cached volume location information which may include, without limitation, a cached list of volumes that are hosted, owned, or managed by a cluster node, and cached volume to disk module 220-1 map, so that a storage module may determine which disk module (e.g., disk module 220-1) hosts, owns, or manages which volume or LUN, and provide the cached volume location information when requested.

The session manager component 238-1 can communicate between the storage module 218-1 and disk module 220-1 via one or more sessions established between the storage module 218-1 and disk module 220-1. The sessions may be used to provide data access (e.g., I/O) operations between the storage module 218-1 and disk module 220-1. The session manager component 238-1 may also be arranged to interface with other session manager components 238 (e.g., session manager component 238-2 (not shown)) in other cluster nodes 104 (e.g., cluster node 104-2) in order to establish one or more sessions and provide data access operations with other disk modules 220 (e.g., disk module 220-2 (not shown)) of other cluster nodes 104 (e.g., cluster node 104-2) such that hosts 102-1 to 102-m can access one or more storage units (e.g., LUNs 106) via one or more LIFs regardless of which cluster node 104 hosts or manages the storage units (e.g., LUNs 106). For example, the host 102-1 may access data contained in LUN 106-2 via LIF 160-1 hosted by cluster node 104-1, even though LUN 106-2 is hosted, owned, or managed by cluster node 104-2.

The disk module 220-1 can host, own, or manage one or more storage units such as, for example, aggregates 114, volumes 116, or LUNs 106 stored in node storages 112 operatively connected to one or more cluster nodes 104-1 to 104-n. The disk module 220-1 can also process data access requests from the storage module 218-1 of Cluster Node 104-1 or storage module (e.g., storage module 218-2 (not shown)) of a different cluster node (e.g., cluster node 104-2). Moreover, the disk module 220-1 may include, among other components, event manager 240-1, cluster quorum manager 206-1, transaction manager 204-1, disk manager component 234-1, a data interface 230-1, a transport component 210-1, a data mobility component 212-1, which may include, without limitation, a LUN relocate component 244-1, an aggregate relocate component 246-1, and a volume relocate component 242-1.

The event manager 240-1 can receive event information associated with one or more components (e.g., cluster quorum manager 206-1) within a cluster node and broadcast or distribute the event information to one or more components within a cluster node, which may include, without limitation, management kernel agent 222-1, transaction manager 204-1, cluster quorum manager 206-1, or SCSI-T component 224-1. For example, in some embodiments, the event manager 240-1 can provide quorum status information received from the cluster quorum manager 206-1 to SCSI-T component 224-1.

The cluster quorum manager 206-1 can determine whether to assume mastership role in a cluster (e.g., cluster 150) or a partition of the cluster based at least partially on the cluster node identifier associated with each cluster node or the existence of another cluster quorum manager (e.g., cluster quorum manager 206-4 (not shown) of cluster node 104-4) assuming the mastership role. Moreover, the cluster quorum manager 206-1 may assume mastership role in the cluster 150 or a partition of the cluster 150 and become a master cluster quorum manager, when there are no other cluster quorum manager assuming a mastership role in that partition. Additionally or alternatively, the cluster quorum manager 206-1 may become a master cluster quorum manager, when the cluster quorum manager 206-1 failed to establish or maintain one or more handshakes via a handshaking mechanism with an existing master cluster quorum manager in the cluster 150.

As a master cluster quorum manager in a partition of a cluster 150, the master cluster quorum manager such as, for example, cluster quorum manager 206-1 can prove the cluster 150 by testing the connection path to another cluster node via the handshaking mechanism in order to determine which cluster nodes are communicatively accessible and operational (i.e., responsive or active) and which cluster nodes are communicatively inaccessible or not operational (i.e., unresponsive or inactive). Moreover, to prove the cluster 150 via the handshaking mechanism, the cluster quorum manager 206-1 can propose to the transaction manager 204-1 one or more heartbeat signals to be sent to cluster quorum managers 206 (e.g., cluster quorum managers 206-2, 206-3, and 206-4 (not shown)) of other cluster nodes 104 (e.g., cluster nodes 104-2, 104-3, and 104-4). Based at least partially on number or frequency of the heartbeat response signals received from the cluster quorum managers of other cluster nodes, the cluster quorum manager 206-1 can determine quorum status information of one or more cluster nodes 104-1 to 104-n.

In some embodiments, the cluster quorum manager 206-1 can communicate with one or more cluster quorum managers 206 of cluster nodes to determine quorum status information, which may include, without limitation, quorum state information, connectivity state information, or operational state information for cluster nodes in the cluster 150. With respect to the quorum state information, the cluster quorum manager 206-1 of cluster node 104-1 can determine whether the number of responsive or active cluster nodes 104 in a partition that includes cluster node 104-1 is greater than the number of unresponsive or inactive cluster nodes 104 in the cluster 150. With respect to the connectivity state information, the cluster quorum manager 206-1 of cluster node 104-1 can determine whether a cluster node such as, for example, cluster node 104-3 is able to communicate with the cluster node 104-1 (e.g., responding to one or more heartbeat signals) in a partition that includes cluster node 104-1. If the cluster node such as cluster node 104-3 is able to communicate with cluster node 104-1 in the partition, then the connectivity state for cluster node 104-3 is "in partition" (i.e., available), otherwise the cluster node is "out of partition" (i.e., unavailable).

With respect to operational state information, the cluster quorum manager 206-1 can receive operational state information for a cluster node in one or more heartbeat response signals transmitted by a high availability partner cluster node of that cluster node in a high-availability pair 152. Moreover, the heartbeat response signal may include, without limitation, the cluster node identifier (i.e., cluster node name or number) or operational state information of a partner cluster node. For example, if the high availability partner cluster node such as, for example, cluster node 104-3 is able to communicate with its partner cluster node 104-4 via cluster interconnect 110 or high-availability interconnect 156-2 and determine that its partner cluster node 104-4 is functional, then the operational state information received from cluster node 104-3 (i.e., a high availability partner) may indicate its partner cluster node 104-4 is "up" (i.e., operational). If the high availability partner cluster node 104-3 is able to communicate and determine that its partner cluster node 104-4 is not functional (e.g., a panic condition has occurred), then the operational state information received from cluster node 104-3 may indicate that the cluster node 104-4 is "down" (i.e., not operational). If the cluster node 104-3 is unable to communicate with cluster node 104-4, then the operational state information received from cluster node 104-3 may indicate that the cluster node 104-4 is "unknown" (i.e., partner cluster node is unreachable). It may be appreciated that based on the quorum status information, one or more components receiving the quorum status information may determine whether a cluster node is out-of-quorum and "out of partition" because the cluster node is powered down (e.g., the cluster node quorum status information is out-of-quorum, "out of partition," and "down") or whether the cluster node is out-of-quorum and "out of partition" because there is a communication failure (e.g., the cluster node quorum status information is out-of-quorum, "out of partition," and "up").

The transaction manager 204-1 can manage and coordinate access, actions, or modifications over a set of resources shared and distributed across the cluster 150. The transaction manager 204-1 can also enable access, actions, or modifications of shared states among a set of collaborating components of cluster nodes distributed across the cluster 150. To coordinate access, actions, or modifications of resources or shared states among cluster nodes, the transaction manager 204-1 can create one or more distributed groups for the management of one or more resources or shared states where components of one or more cluster nodes 104 may join each group as group members to perform access, actions, or modifications to the resources or shared states.

The transaction manager 204-1 of cluster node 104-1 may also communicate with one or more transaction managers 204 (e.g., transaction managers 204-2, 204-3, and 204-4 (not shown)) of one or more (e.g., cluster nodes 104-2, 104-3, and 104-4) in cluster nodes such that one or more components of cluster nodes may view, create, join, or leave one or more distributed groups. Additionally, the components may also propose one or more transactions to perform access, actions, or modifications of one or more shared resources or shared states.

The data mobility component 212-1 can manage or provide data mobility events and event notifications (e.g., pre-relocation or PRE-COMMIT notifications, post-relocation or POST-COMMIT notifications, etc.) such as, for example, the relocation of one or more storage units such as, for example, aggregates 114, volumes 116, or LUNs 106. Moreover, the data mobility component 212-1 may include, without limitation, an aggregate relocate component 246-1, a volume relocate component 242-1, and a LUN relocate component 244-1. The aggregate relocate component 246-1 can move an aggregate, that was hosted, owned, or managed by a source cluster node to a destination cluster node such that the destination cluster node will host, or undertake ownership or management of the aggregate. The volume relocate component 242-1 can move a volume from a source aggregate to a destination aggregate where the source aggregate and destination aggregate may be hosted, owned, or managed by the same cluster node or by different cluster nodes. The LUN relocate component 244-1 can move a LUN from a source volume to a destination volume, where the source volume and the destination volume may be located within an aggregate hosted, owned, or managed by the same cluster node or within two separate aggregates where each aggregate of two separate aggregates is hosted, owned or managed by a different cluster node.

To protect data integrity of data stored in an aggregate, a volume, or a LUN during a data mobility event from a source cluster node in a first partition (e.g., a majority partition) to a destination cluster node in a second partition (e.g., a minority partition) during an interconnect failure 168 of the cluster 150, the data mobility component 212-1 (e.g., aggregate relocate component 246-1, LUN relocate component 244-1, or volume relocate component 242-1) of the source cluster node in the first partition can notify one or more components of the source cluster node regarding the beginning of the data mobility event and the completion of the data mobility event. Additionally, the components of the source cluster node may further notify one or more components of other cluster nodes in the same partition as the source cluster node regarding the beginning of the data mobility event and the completion of the data mobility event.

In some embodiments, the aggregate relocate component 246-1 of the cluster node 104-1 can notify one or more components of the cluster node 104-1 such as, for example, the disk manager component 234-1, when an aggregate begins or completes its relocation from cluster node 104-1 to a new cluster node. In some embodiments, the volume relocate component 242-1 of the cluster node 104-1 may be also configured to notify one or more components of the cluster node 104-1 such as, for example, the disk manager component 234-1, when a volume begins or completes relocation from aggregate 114-1 of cluster node 104-1 to a different aggregate managed by a different cluster node. In some embodiments, the LUN relocate component 244-1 of the cluster node 104-1 may be also configured to notify one or more components of the cluster node 104-1 such as, for example, the disk manager component 234-1, when a LUN begins or completes relocation from a volume 116-1 of cluster node 104-1 to a different volume managed by a different cluster node. In some embodiments, the LUN relocate component 244-1 of the cluster node 104-1 may be also configured to notify one or more components of the cluster node 104-1 such as, for example, the disk manager component 234-1, when a LUN begins or complete relocation from a volume 116-1 of cluster node 104-1 to a different volume managed by the same cluster node, such as, for example, cluster node 104-1.

The disk manager component 234-1 can manage or perform LUN (e.g., a Network Appliance® vDisk in a cluster 150) related management and configuration actions or operations (e.g., LUN create) in response to one or more requests from the distributed management component 208-1. The disk manager component 234-1 can also maintain LUN-related internal structures within a volume. The disk manager component 234-1 can also store data streams that constitute the host addressable portion of a LUN, LUN-related configuration information, and metadata used by the disk manager 234-1 or SCSI-T component 224-1.

The data interface 230-1 can interface with the storage module 218-1 or other storage modules 218 in cluster nodes via one or more intra-process or inter-process communication mechanisms such as, for example, SpinNP protocol in order to provide data access to LUN 106-1 hosted, owned, or managed by the disk module 220-1. To ensure that the data interface 230-1 interfaces with the appropriate storage module 218-1, each data interface component (e.g., data interface 230-1) of a disk module (e.g., disk module 220-1) may also be registered with the session manager component (e.g., session manager component 238-1) of their respective cluster nodes. The data interface 230-1 can also translate the data access received from one or more storage modules 218 to a storage interface protocol used by the storage interface component 232-1 to perform one or more file I/O operations.

The transport component 210-1 can provide SCSI transport using FCP, iSCSI, or FCoE protocols and manage one or more LIFs (e.g., LIF 160-1) to interface with hosts 102. Moreover, to provide data access to the initiators included in or communicatively coupled to host 102-1, the transport component 210-1 can also establish a connection with the hosts 102, and communicate with the SCSI-T component 224-1 in order to provide the established connection to the SCSI-T component 224-1 as a SCSI-Port.

The storage interface component 232-1 can receive one or more file I/O operations from the data interface 230-1 and provide data access to the storage units (e.g., aggregates, volumes, or LUNs). Moreover, the storage interface component 232-1 can provide read and write functionality to one or more physical disks using one or more file layouts such as, for example, the Write Anywhere File Layout ("WAFL") that provides read and write functionality to data in one or more data blocks.

Figure 4:
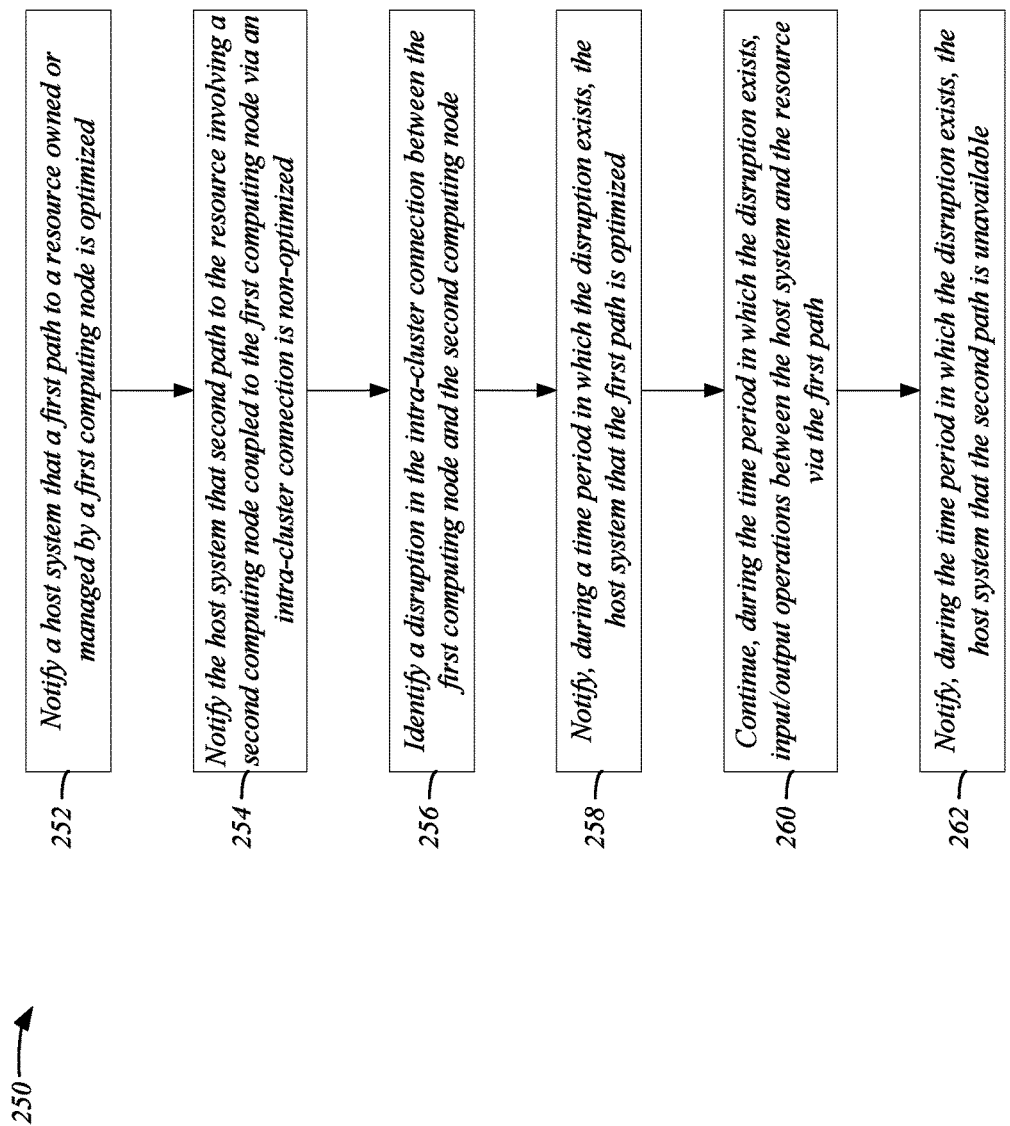
FIG. 4 illustrates an example of a method for managing the availability of resources based on their location in a clustered computing system that has experienced an intra-cluster communication disruption, according to certain embodiments.

The systems and devices depicted in FIGS. 1-3 can be used to fence access to resources of a cluster computing system in a manner that accounts for the location of these resources. For example, FIG. 4 illustrates an example of a method 250 for managing the availability of resources based on their location in a distributed storage environment 100 that has experienced a partition or other intra-cluster communication disruption, according to certain embodiments. For illustrative purposes, the method 250 is described with reference to the examples depicted in FIGS. 1-3. Other implementations, however, are possible.

The method 250 involves notifying a host system that a first path to a resource owned or managed by a first computing node is optimized, as depicted in block 252. One or more devices included in or communicatively coupled to a distributed computing system, such as (but not limited to) the distributed storage environment 100, can implement block 252 by, for example, transmitting one or more messages via a data network (e.g., the host-node interconnect network 108) identifying the states of paths to a resource.

In some embodiments, one or more cluster nodes 104-1, 104-2, 104-3, and 104-4 may implement the ALUA multi-pathing protocol to notify a host 102-1 regarding which paths are classified as A/O with respect to one or more resources (e.g., LUNs 106) in the cluster 150. In the example depicted in FIGS. 2 and 3, a SCSI-T component or other suitable component of a cluster node can notify a host system that a path that includes a computing node that owns or manages a resource is optimized. For instance, a path 164-4 to a LUN 106-4, which includes a cluster node 104-4 that owns or manages the LUN 106-4, can be identified as an active/optimized path to the LUN 106-4 in the ALUA protocol. One or more of the cluster nodes 104-1, 104-2, 104-3, and 104-4 can transmit, using the ALUA protocol, a message to a host 102-1 with this identification of the path 164-4 as the optimized path.

The method 250 also involves notifying the host system that second path to the resource involving a second computing node coupled to the first computing node via an intra-cluster connection is non-optimized, as depicted in block 252. One or more devices included in or communicatively coupled to a distributed computing system, such as (but not limited to) the distributed storage environment 100, can implement block 254 by, for example, transmitting one or more messages via a data network (e.g., the host-node interconnect network 108) identifying the states of paths to a resource.

In some embodiments, one or more cluster nodes 104-1, 104-2, 104-3, and 104-4 may implement the ALUA multi-pathing protocol to notify a host 102-1 regarding which paths are classified as A/NO with respect to one or more resources (e.g., LUNs 106) in the cluster 150. In the example depicted in FIGS. 2 and 3, a SCSI-T component or other suitable component of a cluster node can notify a host system that a path that includes a computing node other than the node that owns or manages a resource is active, but not optimized. For instance, a path 164-3 to a LUN 106-4, which includes a cluster node 104-3 included in a high-availability pair 151-2 with the cluster node 104-4, can be identified as an active/non-optimized path to the LUN 106-4 in the ALUA protocol. One or more of the cluster nodes 104-1, 104-2, 104-3, and 104-4 can transmit, using the ALUA protocol, a message to a host 102-1 with this identification of the path 164-3 as an active, non-optimized path. Similar operations may be performed with respect to one or more of the paths 164-1 and 164-2 and the LUN 106-4.

The method 250 also involves identifying a disruption in the intra-cluster connection between the first computing node and the second computing node, as depicted in block 256. For instance, in the example depicted in FIG. 2, an interconnect failure 168 may disrupt communications within the cluster 150. This disruption of intra-cluster connections from the cluster node 104-4 to one or more of the cluster nodes 104-1, 104-2, and 104-3 can prevent the sharing of configuration information or other metadata within the cluster 150. Examples of configuration information include, but are not limited to, volume access state information, cached volume location information, quorum state information, connectivity state information, or operational state information, cached volume configuration information and cached Vserver configuration information, and other metadata used or distributed among cluster computing nodes, as described above.

The disruption can be determined in any suitable manner. For example, if an interconnect failure 168 occurs, the cluster nodes 104-1, 104-2, 1043 may determine that the cluster node 104-4 is not communicatively accessible to any of these nodes. In some embodiments, a cluster quorum manager or other suitable software can be executed on a given computing node to determine this lack of communicative accessibility (e.g., by testing the connection path to another cluster node via a handshaking procedure, a heartbeat procedure, etc.).

In some embodiments, identifying the disruption can involve determining that the cluster 150 has been partitioned into two or more partitions. A first partition can include the computing node associated with the path advertised as "optimized" in block 252. A second partition can include one or more other nodes included in one or more paths advertised as "non-optimized" at block 254. The second partition may be an "active" partition (e.g., majority partition) for the cluster 150, and can exclude the computing node associated with the path advertised as "optimized" in block 252. For example, as described above, a cluster node 104-4 can be identified as "out of partition" if the interconnect failure 168 or other disruption results in a partition of the cluster 150 into a first partition that includes the cluster node 104-4 and a second partition that includes the cluster nodes 104-1, 104-2, and 104-3.

The method 250 also involves notifying, during a time period in which the disruption exists, the host system that the first path is optimized, as depicted in block 258. One or more nodes in a distributed computing system can execute suitable operations to implement block 258. One or more computing devices that are included in or communicatively coupled to the distributed computing system can transmit suitable messages to a host system via a data network that indicate the availability of a given path. The path to the resource can be advertised as available (e.g., by maintaining the ALUA state of "active optimized"). For example, a cluster node 104-4 can execute a SCSI-T component or other suitable software and thereby notify a host 102-1 that the path 164-4 to the LUN 106-4 is active/optimized. The cluster node 104-4 can generate and transmit this notification during a time period in which the cluster node 104-4 is unable to communicate with other nodes within the cluster 150 (e.g., cluster nodes 104-1, 104-2, 104-3).

The method 250 also involves continuing, during the time period in which the disruption exists, I/O operations between the host system and the resource via the first path, as depicted in block 260. For example, a cluster node 104-4 can continue to respond to read requests, write requests, or other I/O operations that are received from the host 102-1 and that require accessing data stored on the LUN 106-4. Thus, from the perspective of the host 102-1, the LUN 106-4 remains available even if a partition event or other intra-cluster communication disruption occurs.

The method 250 also involves notifying, during the time period in which the disruption exists, the host system that the second path is unavailable, as depicted in block 262. One or more nodes in a distributed computing system can execute suitable operations to implement block 262. One or more computing devices that are included in or communicatively coupled to the distributed computing system can transmit suitable messages to a host system via a data network that indicate with statuses of certain paths to a cluster resource, where the transmitted status indicate that the paths are unavailable. The path to the resource through the second node can be advertised as unavailable (e.g., by maintaining the ALUA state of "unavailable"). In this manner, the resource (e.g., a LUN) can remain available to host systems via the path to the first node, but the host systems can be prevented from modifying configuration information (e.g., metadata) on the second node regarding the resource.

In some embodiments, one or more of the cluster nodes can respond to the disruption by fencing one or more nodes in one or more minority partitions. For instance, in the examples depicted in FIGS. 2 and 3, one or more of the cluster nodes 104-1, 104-2, and 104-3 can identify paths within the distributed storage system that involve both the cluster node 104-1 and one or more of the cluster nodes 104-1, 104-2, and 104-3 (e.g., paths 164-2, 164-3, and 164-4 to the LUN 106-4). One or more of the cluster nodes 104-1, 104-2, and 104-3 can identify tasks assigned to the cluster nodes 104-1, 104-2, and 104-3. One or more of the cluster nodes 104-1, 104-2, and 104-3 can determine that the identified tasks include I/O operations involving resources that are owned or managed by the cluster node 104-1, such as operations involving the LUN 106-4. One or more of the cluster nodes 104-1, 104-2, and 104-3 can abort the tasks having the I/O operations the resources owned or managed by the fenced node (e.g., operations involving the LUN 106-4). One or more SCSI-T components or other suitable software can be executed by one or more of the cluster nodes 104-1, 104-2, and 104-3 to generate and transmit a notification to the host 102-1 (or another host system) that the paths 164-2, 164-3, and 164-3 (i.e., the paths to the LUN 106-4 involving the cluster nodes 104-1, 104-2, 104-3) are unavailable for access the resource that is owned or managed by the fenced node.

Although the operations of the method 250 are described above with respect to a single partition, these operations can be implemented for any number of partitions in a cluster computing system. For example, if multiple intra-cluster disruptions occur in which the cluster node 104-1 is communicatively inaccessible to other nodes and the cluster node 104-2 is communicatively inaccessible to other nodes, each of the cluster nodes 104-1 and 104-2 can be fenced in the manner described above. The respective paths to resources owned or managed the cluster nodes 104-1 and 104-2 can be advertised as "active/optimized" during these disruptions, while other paths to the cluster nodes 104-1 and 104-2 can be changed from "active/non-optimized" to "unavailable."

In some embodiments, a subset of available commands (e.g., SCSI commands) can be maintained for the "unavailable" paths to the fenced node. For example, during a time period in which the disruption exists, the cluster 150 may receive commands from a host system that identifies one of the paths 164-1, 164-2, or 164-3 and that specifies an action involving a modification of data stored on the LUN 106-4 or other storage resource owned or managed by the cluster node 104-4. If received commands that are deemed essential for avoiding disruption (e.g., probing commands) to operations by host systems, the cluster 150 can support these commands. For example, if a probing command with respect to one or more of the paths 164-1, 164-2, and 164-3 involves a read-only operation with respect to the LUN 106-4, one or more of the cluster nodes 104-1, 104-2, 104-3 may respond to the command. If other, non-essential commands are received, these commands may be returned to the host system with a protocol error (e.g., a message that the path is "Not Ready—Unavailable") or other error message indicating that the paths are unavailable.

For illustrative purposes, certain operations of the method 250 have been described above for partition events. However, other types of disruptions in intra-cluster communication can be used in the method 250. In one example, some or all nodes in a cluster 150 can be rebooted. During the reboot operation, some nodes may be accessible via intra-cluster connections, and other nodes may be inaccessible via intra-cluster connections. If certain nodes (e.g., cluster nodes 104-1, 104-2, and 104-3) come online before another node (e.g., the cluster node 104-4), then the operations described above with respect to method 250 can be used to fence the cluster node 104-4 (e.g., by advertising one or more paths 164-1, 164-2, 164-3 to the LUN 106-4 as "unavailable").

This can allow LUNs or other cluster resources to be mapped without waiting for the owning node to come online. Once the cluster node 104-4 comes online, normal operations may resume (e.g., advertising one or more paths 164-1, 164-2, 164-3 to the LUN 106-4 as "active, non-optimized").

For illustrative purposes, the operations of method 250 have been described with respect to a cluster 150 using the ALUA protocol. However, other implementations are possible. For instance, in additional or alternative embodiments, other suitable protocols can be used for transmitting messages to a host system regarding a LUN or other resource that is included in, managed by, or otherwise accessible via a distributed computing system.

Figure 5:
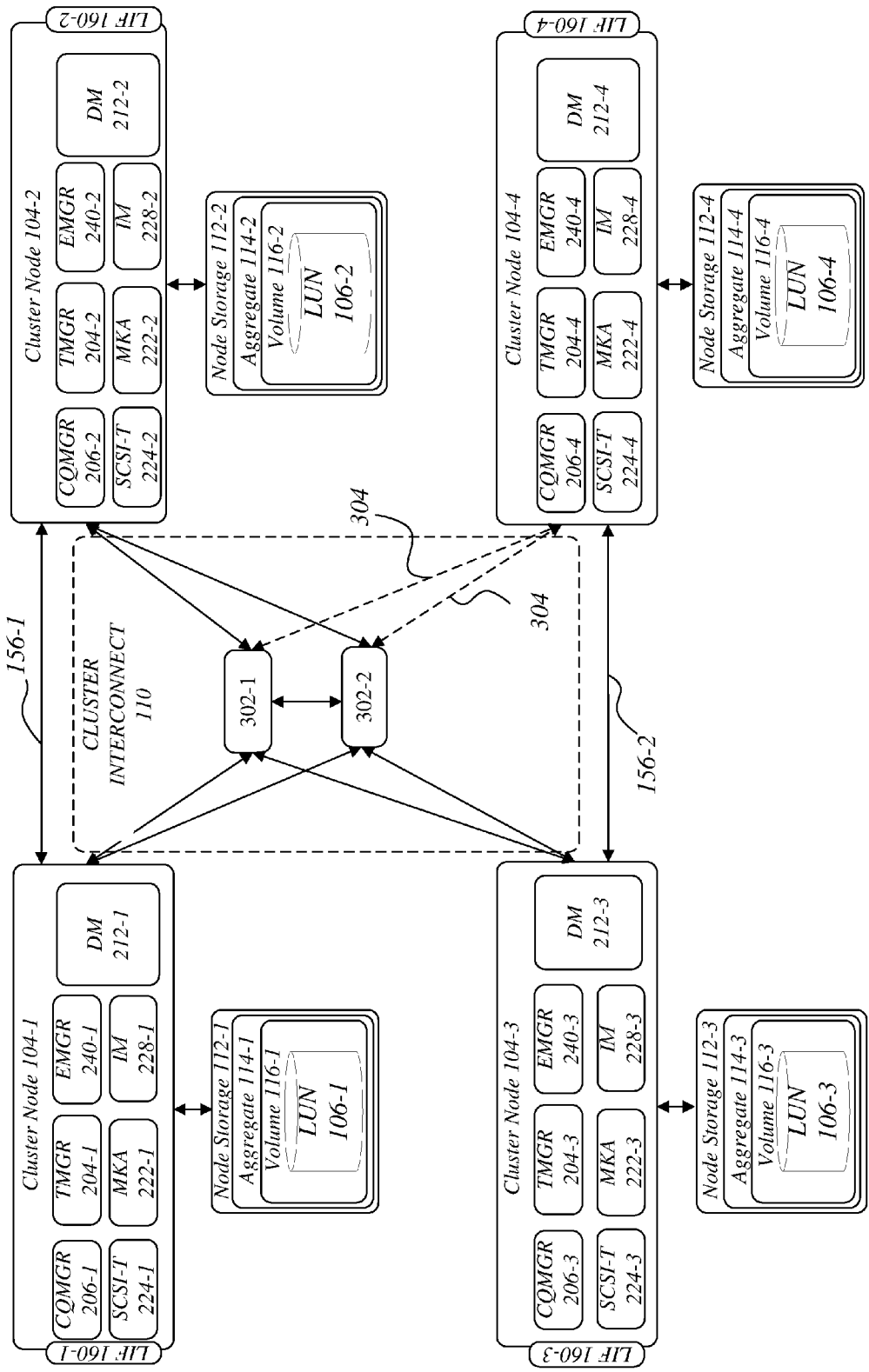
FIG. 5 illustrates an example of a cluster storage subsystem in which a cluster interconnect failure has occurred, according to certain embodiments.

FIGS. 5 and 6A-6D depict a detailed example of an operating environment 300 in which the fencing operations described above can be used. For instance, FIG. 5 illustrates an example of the cluster storage sub-system 175 in which a cluster interconnect failure 304 has occurred in the cluster interconnect 110.

In the cluster storage sub-system 175, cluster nodes 104-1, 104-2, 104-3, and 104-4 can be communicatively coupled via the cluster interconnect 110. The cluster interconnect 110 can include networking components 302-1 and 302-2 (e.g., hubs, switches, routers, load balancers, etc.). The networking components 302-1 and 302-2 can provide intra-cluster connections that facilitate communications among cluster nodes 104-1, 104-2, 104-3, and 104-4. In some embodiments, cluster nodes 104-1, 104-2 and cluster nodes 104-1, 104-2 can be configured as high-availability pairs (not shown). During a cluster interconnect failure 304 or other disruption in intra-cluster communication, a cluster node 104-4 may become an isolated cluster node. The cluster node 104-4 can transition from the same partition (e.g., a majority partition) as cluster nodes 104-1, 104-2, 104-3, and 104-4 into a separate partition (e.g., a minority partition).

FIGS. 6A-6D illustrate examples of operations that occur within the operating environment 300 if the cluster interconnect failure 304 or other disruption in intra-cluster communication occurs. These figures illustrate operations of the cluster nodes 104-1, 104-2, 104-3, and 104-4 and one or more components of the cluster nodes 104-1, 104-2, 104-3, and 104-4 using the ALUA protocol. However, other suitable protocols may be used.

In this example, before interconnect failure 304 occurs, the ALUA access states from the perspectives of cluster nodes 104-1, 104-2, 104-3, 104 are as illustrated in the ALUA access states tables 308. An ALUA access state table 308 provides the ALUA access states from the perspective of a cluster node for each LUN (e.g., LUNs 106-1, 106-2, 106-3, and 106-4) through a LIF hosted by the cluster node. The ALUA access state table 308 can also provide the ALUA access states from the perspective of a cluster node for each LUN through LIF (e.g., LIF 160-2, 160-3, and 160-4) not hosted by the cluster node (i.e., a remote or non-local LIF). To ensure that hosts 102-1 to 102-$m$ (e.g., host 102-1) use the active/optimized path to access the LUNs 106 through one or more LIFs 160, the SCSI-T component of each cluster node can report or indicate its ALUA access states to the hosts 102.

At time $t_0$, a cluster interconnect failure event 310 occurs. For example, the cluster interconnect 110 as shown in FIG. 5 may fail. This can cause the cluster node 104-4 to become isolated from the cluster nodes 104-1, 104-2, and 104-3.

At time $t_1$, the cluster quorum manager 206-1 of cluster node 104-1 may detect a heartbeat failure with respect to the cluster node 104-4, as depicted in block 312. For example, the cluster quorum manager 206-1 may detect that the heartbeat begins to fail to a cluster node 104-4 because the cluster node 104-4 has failed to respond to one or more heartbeat signals.

At time $t_2$, a cluster quorum manager 206-4 of cluster node 104-4 can assume the role of a master cluster quorum manager, as depicted in block 314. The cluster quorum manager 206-4, as the master cluster quorum manager, can determine which cluster nodes are in the same partition (e.g., same minority partition) as cluster node 104-4.

At time $t_3$, the cluster quorum manager 206-4 of the cluster node 104-4 may detect that a heartbeat begins to fail to the cluster nodes 104-1, 104-2, and 104-3, as depicted in block 316. For example, the cluster quorum manager 206-4, which has assumed mastership role to become a master cluster quorum manager, may detect that one or more of the cluster nodes 104-1, 104-2, and 104-3 has failed to respond to one or more heartbeat signals transmitted by cluster node 104-4.

At time $t_4$, a cluster quorum manager 206-1 of the cluster node 104-1 may declare the cluster node 104-4 out-of-quorum, "out of partition," and "up," as depicted in block 318. The cluster quorum manager 206-1 can provide status information to one or more nodes in the partition at block 318. For example, the cluster quorum manager 206-1 of cluster node 104-1, as a master cluster quorum manager, may declare that cluster node 104-4 is out-of-quorum, "out of partition," and "up" after determining that cluster node 104-4 has failed to respond to a threshold value (e.g., four or more) of heartbeat signals.

The cluster quorum manager 206-1 may determine whether a cluster node is out-of-quorum based on (at least in part) the number of communicatively accessible and operational cluster nodes in a partition as compared to the number of cluster nodes in the entire cluster as previously discussed. The cluster quorum manager 206-1 may also provide quorum status information that may include, without limitation, quorum state information indicating cluster node 104-4 is out-of-quorum, connectivity state information indicating that the cluster node 104-4 is "out of partition," and operational state information indicating that the cluster node is 104-4 is "up" to cluster nodes 104-1, 104-4, and 104-3.

The cluster node 104-3 may determine whether cluster node 104-4 is "up" (i.e., operational) via the high-availability interconnect 156-2 during the interconnect failure 304. The cluster quorum manager 206-1 of cluster node 104-1 may also partition the cluster nodes into a majority partition (including cluster nodes 104-1, 104-2, and 104-3) and one or more minority partitions (including cluster node 104-4).

At time $t_5$, one or more components of cluster nodes 104-1, 104-2, and 104-3 may receive status information, as depicted in block 320. For example, one or more components such as interface modules 228-1, 228-2, and 228-3 and transaction managers 204-1, 204-2, and 204-3 of the cluster nodes 104-1, 104-2, and 104-3 may receive quorum status information from their respective event managers 240-1, 240-2, and 240-3. Additionally, to protect integrity of information stored in the storage units, the interface modules 228-1, 228-2, and 228-3 may communicate with and notify SCSI-T components 224-1, 224-2, and 224-3 to begin fencing off any access via LIFs 160-1, 160-2, and 160-3 to any LUNs owned or managed by cluster node 104-4 (e.g., LUN 106-4), in response to one or more access requests for LUNs owned or managed by cluster node 104-4 (e.g., LUN 106-4) received via LIFs 160-1, 160-2, and 160-3 from one or more hosts.

At time $t_6$, transaction manager 204-1, transaction manager 204-2, and transaction manager 204-3 of cluster nodes 104-1, 104-2, and 104-3, respectively, may evict the cluster node 104-4 from groups, as depicted in block 322. For example, transaction managers 204-1, 204-2, and 204-3 of cluster nodes 104-1, 104-2, and 104-3, respectively, may evict one or more components (e.g., management kernel agent 222-4 or SCSI-T component 224-4) of cluster node 104-4. The transaction managers 204-4 of the cluster nodes 104-4 may also evict one or more components (e.g., management kernel agent 222-4 or SCSI-T component 224-4) of cluster node 104-4 from groups involving the cluster nodes 104-1, 104-2, and 104-3. These components may be represented as group members in one or more distributed groups such as, for example, distributed Vserver groups coordinating access, actions, or modifications to Vservers (e.g., Vserver 120-1) in which cluster nodes 104-1, 104-2, and 104-3 may be involved, and distributed volume groups coordinating access, actions, or modifications to volumes (e.g., volumes 116-1, 116-2, and 116-3) that cluster nodes 104-1, 104-2, and 104-3 may host, own, or manage. Moreover, because cluster node 104-4 is no longer part of any distributed Vserver groups in the majority partition, the management kernel agents 222-1, 222-2, and 222-3 may prevent modifications to Vserver configuration information for any Vservers that the cluster node 104-4 is involved with such as, for example, Vserver 120-1. Additionally, because the cluster node 104-4 is no longer part of any distributed volume groups in the majority partition, transactions (e.g., resizing a LUN in a volume, changing an attribute of a LUN in a volume, etc.) requiring non-local access to a volume that is hosted, owned, or managed by cluster node 104-4 will fail.

Figure 6A:
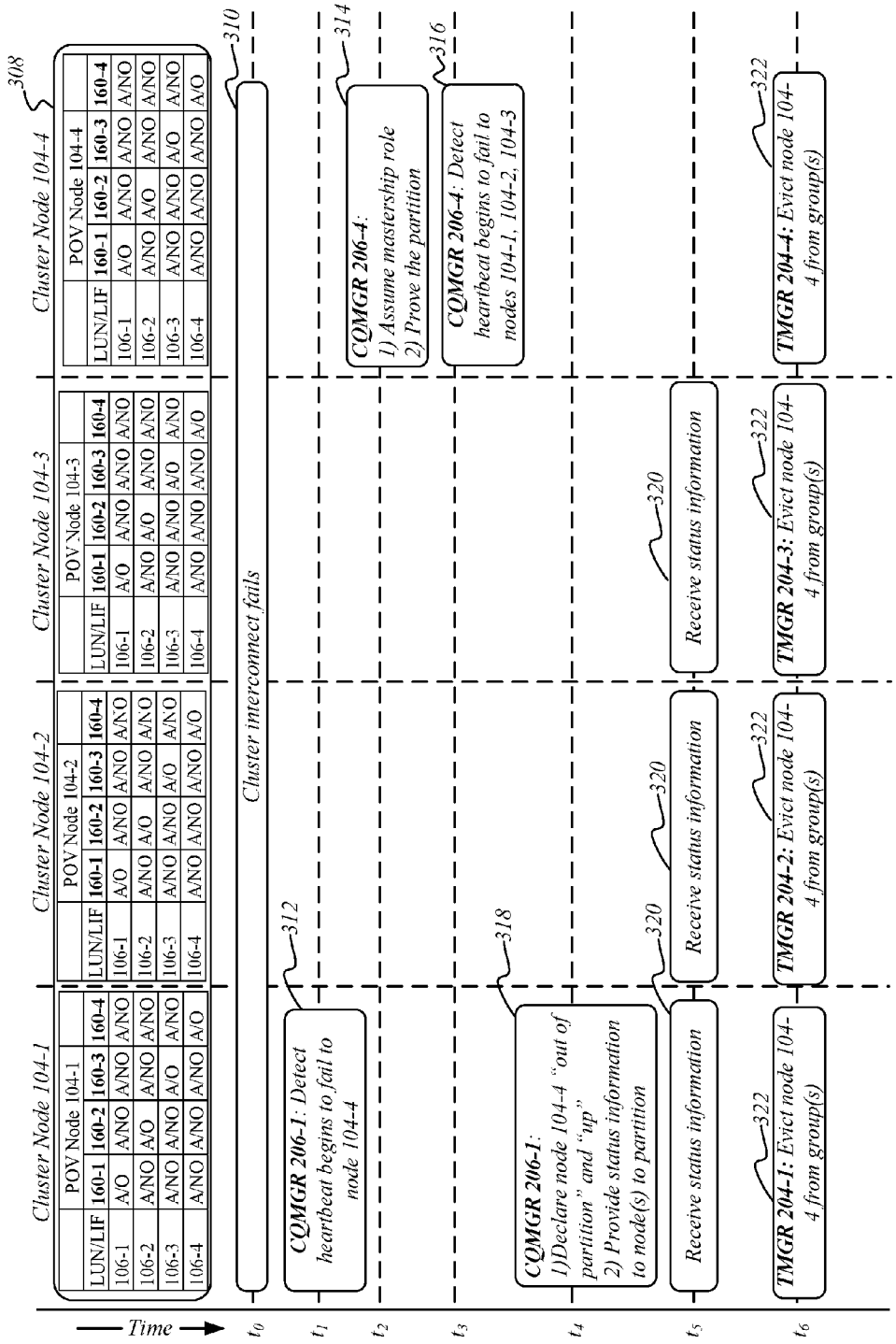
FIG. 6A illustrates operations performed in an operating environment involving the cluster storage sub-system of FIG. 5, according to certain embodiments.
Figure 6B:
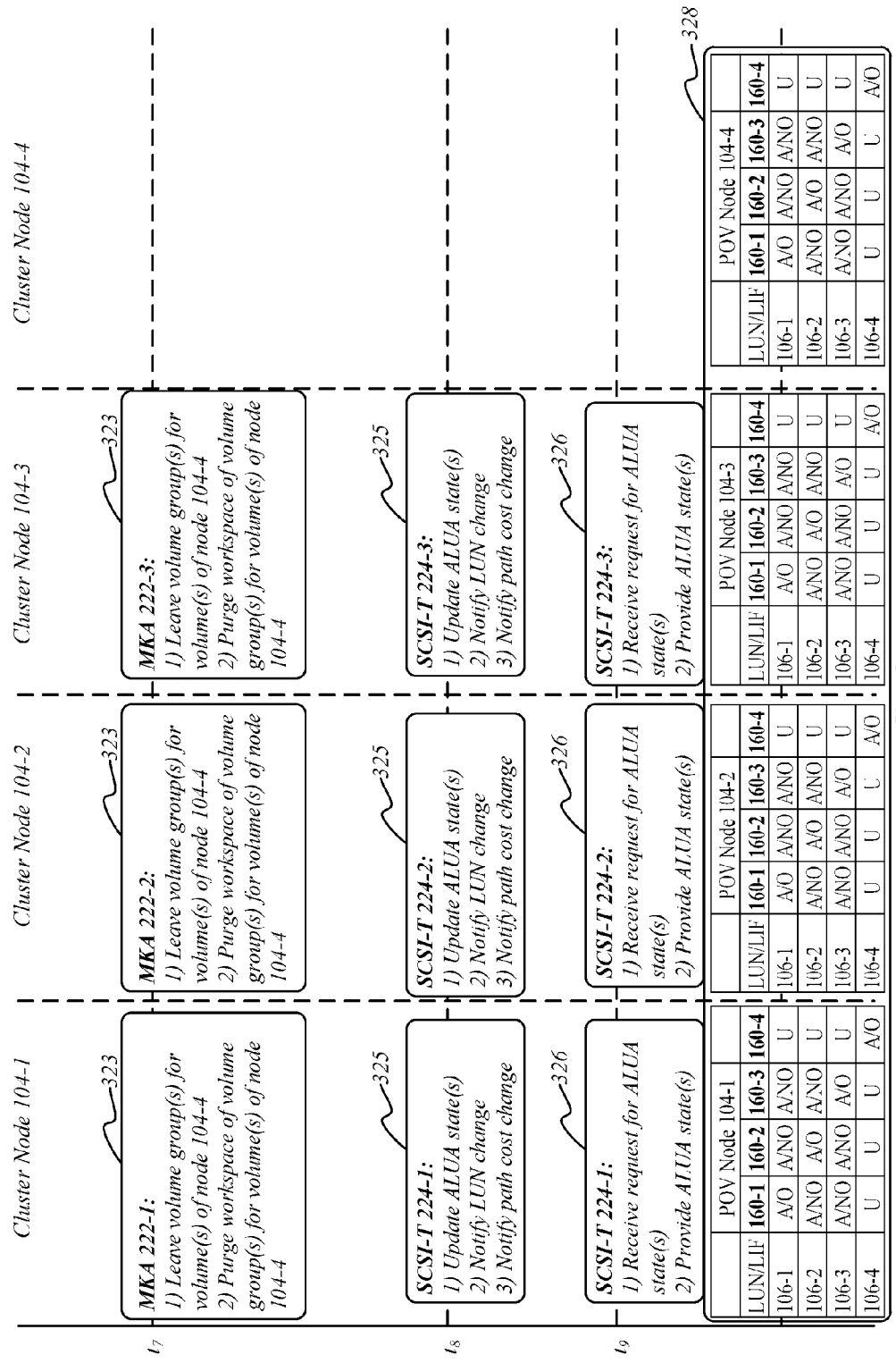
FIG. 6B illustrates a continuation of the operations performed in an operating environment involving the cluster storage sub-system of FIG. 5, according to certain embodiments.

FIG. 6B illustrates a continuation of the embodiment of the operating environment 300 for the cluster storage subsystem 175 starting at time $t_7$. At time $t_7$, management kernel agent 222-1, 222-2, and 222-3 of cluster nodes 104-1, 104-2, and 104-3, respectively, may leave volume groups for volumes of cluster node 104-4 and purge workspaces of volume groups for volumes of cluster node 104-4, as depicted in block 323. For example, the management kernel agents 222-1, 222-2, and 222-3 may leave volume groups associated with volumes (e.g., volume 116-4) residing on or managed by cluster node 104-4. Additionally, the management kernel agents 222-1, 222-2, and 222-3 may purge workspace of the distributed volume groups managing volumes (e.g., volume 116-4) so that configuration information associated with the volumes (e.g., volume 116-4) may no longer be accessible or stored by cluster nodes 104-1, 104-2, and 104-3.

At time $t_8$, the SCSI-T components 224-1, 224-2, and 224-3 of cluster nodes 104-1, 104-2, and 104-3, respectively perform various operations, as depicted in block 325. These operations can also include updating ALUA states. These operations can also include providing notifications of LUN changes. These operations can also include providing notifications of path status changes.

For example, the SCSI-T components 224-1, 224-2, and 224-3 may update ALUA access states for paths involving LIFs 160-1, 160-1, 160-2, 160-3, and 160-4 with respect to LUNs 106-1, 106-2, 106-3, and 106-4. The ALUA states may be updated based on the quorum status information provided by the respective cluster quorum managers 206-1, 206-2, and 206-3 via the respective event managers 240-1, 240-2, and 240-3. Additionally or alternatively, the ALUA states may be updated based on the volume access state information stored, updated, or provided by the respective management kernel agents 222-1, 222-2, and 222-3. Additionally or alternatively, the ALUA states may be updated based on cached volume location information stored, updated, or provided by the respective interface modules 228-1, 228-2, and 228-3.

With continued reference to time at $t_8$, the SCSI-T components 224-1, 224-2, and 224-3 may further notify the hosts 102-1 to 102-$m$ of a LUN change indicating a LUN inventory update and one or more LUNs on one or more LIFs has now become not reported. To notify the hosts 102-1 to 102-$m$ using SCSI protocol, SCSI-T components 224-1, 224-2, and 224-3 may set UNIT_ATTENTION ("U/A") to REPORT_LUNS_DATA_HAS_CHANGED ("RLDHC") on the Initiator_Target_nexus ("I_T"). Further, SCSI-T components 224-1, 224-2, and 224-3 may also notify the hosts 102-1 to 102-$m$ of path status changes, which indicate that certain ALUA access states have been changed or updated. For example, to notify the hosts 102-1 to 102-$m$ using SCSI protocol, SCSI-T components 224-1, 224-2, and 224-3 may set U/A to ASYMMETRIC_ACCESS_STATE_CHANGED ("AASC") on the Initiator_Target_LUN nexus ("I_T_L").

At time $t_9$, SCSI-T components 224-1, 224-2, 224-3, and 224-4 of cluster nodes 104-1, 104-2, 104-3, and 104-4, respectively, may receive requests for ALUA states and provide ALUA states, as depicted in block 326. For example, SCSI-T components 224-1, 224-2, 224-3, and 224-4 may receive requests for the updated or latest ALUA access states and provide the updated ALUA access states, as illustrated in the ALUA access state tables 328. To retrieve the current ALUA states for each LUN using SCSI protocol, hosts 102-1 to 102-$m$ may send a REPORT_TARGET_PORT_GROUP ("RTPG") request. Additionally, because cluster node 104-4 has become isolated, the ALUA access states for LIF 160-4 from perspectives of cluster nodes 104-1, 104-2, and 104-3 may be identified as "unavailable" for LUNs 106-1, 106-2, 106-3, and 106-4. As depicted in FIG. 6B, the cluster nodes 104-1, 104-2, and 104-3 can advertise access states to and from the cluster node 104-4 as "unavailable." The ALUA access state for direct paths through the node 104-4 to a resource is advertised as "available."

Figure 6C:
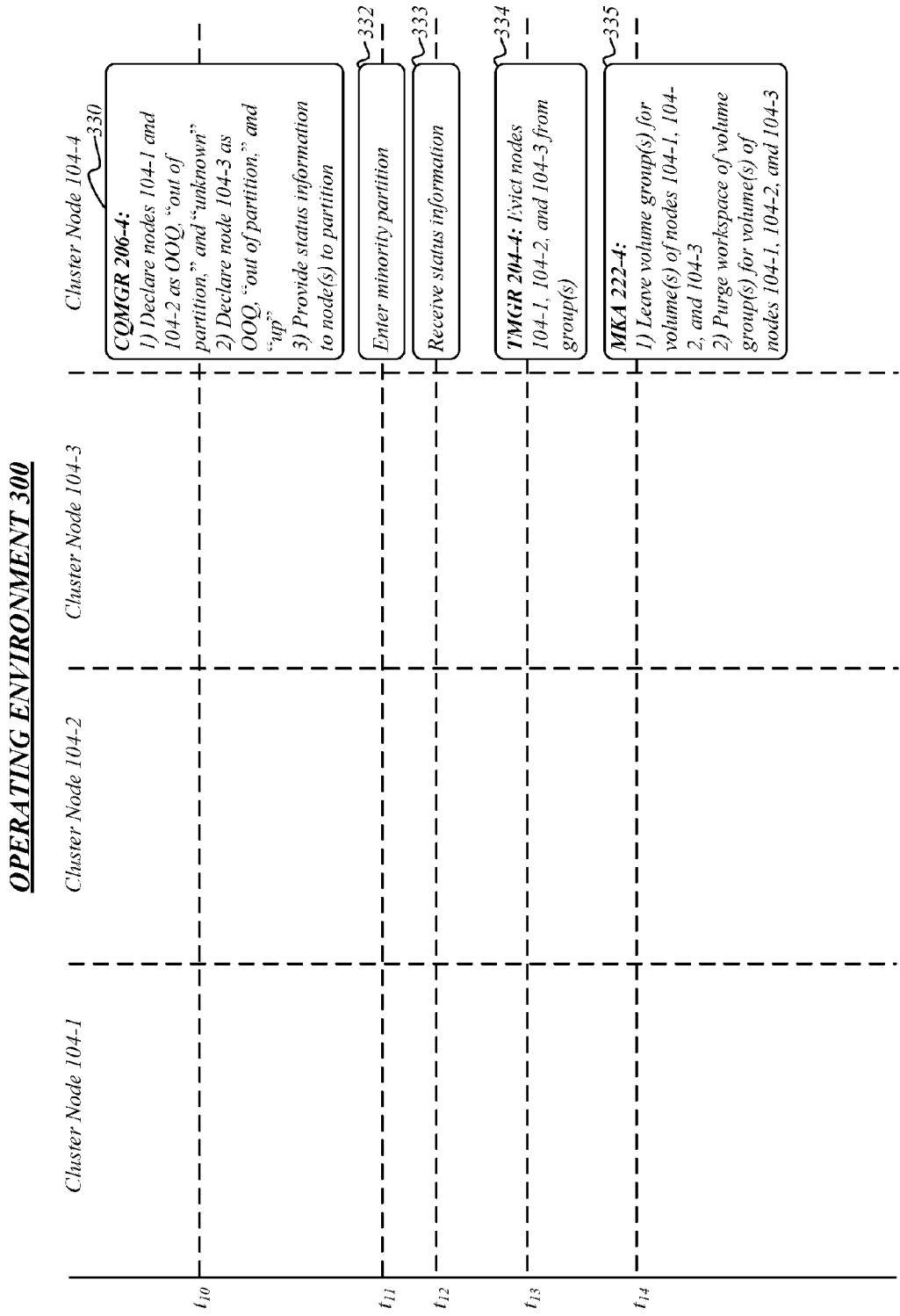
FIG. 6C illustrates another continuation of the operations performed in an operating environment involving the cluster storage sub-system of FIG. 5, according to certain embodiments.

FIG. 6C illustrates a continuation of the embodiment of the operating environment 300 for cluster storage subsystem 175 staring at time $t_{10}$.

At time $t_{10}$, cluster quorum manager 206-4 of cluster node 104-4 may declare cluster nodes 104-1 and 104-2 as out-of-quorum, "out of partition," and "unknown," and may also declare cluster node 104-3 as out-of-quorum, "out of partition," and "up," and provide status information to nodes to partition, as depicted in block 330. For example, the cluster quorum manager 206-4, as a master cluster quorum manager, may declare that cluster nodes 104-1 and 104-2 as out-of-quorum, "out of partition," and "unknown" and cluster node 104-3 as out-of-quorum, "out of partition," and "up" after determining that cluster node 104-1, 104-2, and 104-3 failed to respond to a threshold value of heartbeat signals (e.g., four heartbeat signals). The cluster quorum manager 206-4 may also provide quorum status information to cluster node 104-4. The quorum status information may include, without limitation, the quorum state information indicating that cluster nodes 104-1, 104-2, and 104-3 are out-of-quorum, the connectivity state information indicating that cluster nodes 104-1, 104-2, and 104-3 are "out of partition," and operational state information indicating that cluster nodes 104-1 and 104-2 are "unknown" and cluster node 104-3 is "up." The cluster node 104-4 may determine whether cluster node 104-3 is "up" (i.e., operational) via the high-availability interconnect 156-2 during the interconnect failure 304 as previously discussed. The cluster quorum manager 206-4 may also begin partitioning the cluster nodes into a majority partition and one or more minority partitions.

At time $t_{11}$, cluster node 104-4 may enter a minority partition status, as depicted in block 332. For example, the cluster quorum manager 206-4, as a master cluster quorum manager, may determine that cluster node 104-4 is isolated from cluster nodes 104-1, 104-2, and 104-3 and accordingly, do not meet the criteria to maintain quorum to remain or transition to the majority partition (i.e., cluster node 104-4 is out-of-quorum). Additionally, to protect data integrity, the interface module 228-4 may begin fencing off access, via the cluster node 104-4, to any non-local LUNs (e.g., LUNs 106-1, LUN 106-2, and LUN 106-3) hosted, owned, or managed by cluster nodes 104-1, 104-2, and 104-3.

At time $t_{12}$, one or more components of cluster node 104-4 may receive status information, as depicted in block 333. For example, one or more components such as the interface module 228-4 and the transaction manager 204-4 of the cluster node 104-4 may receive quorum status information from the event manager 240-4. To protect data integrity, the interface module 228-4 may communicate with and notify the SCSI-T component 224-4 to begin fencing off access via LIF 160-4 to any LUN owned or managed by cluster nodes 104-1, 104-2, 104-3 such as, for example, LUNs 106-1, 106-2, and 106-3, in response to one or more access requests received via LIF 160-4 from one or more hosts (e.g., host 102-1).

At time $t_{13}$, transaction manager 204-4 of cluster node 104-4 may evict the cluster nodes 104-1, 104-2, and 104-3 from groups, as depicted in block 334. For example, transaction manager 204-4 may evict one or more components (e.g., management kernel agents 222-1, 222-2, and 222-3 or SCSI-T components 224-1, 224-2, and 224-3) of cluster nodes 104-1, 104-2, and 104-3, which may be represented as group members in one or more groups (e.g., distributed Vserver groups, distributed volume groups, and distributed logical unit groups). The eviction can remove components of the cluster nodes 104-1, 104-2, and 104-3 from the groups identified by the cluster node 104-4 (e.g., distributed Vserver group that manages Vserver 120-1, a distributed volume group that manages the volume 116-4, and a distributed logical unit group that manages the LUN 106-4). Because cluster nodes 104-1, 104-2, and 104-3 are no longer part of any distributed Vserver groups maintained at cluster node 104-4, distributed Vserver groups involving cluster nodes 104-1, 104-2, and 104-3 will now become static or immutable by management kernel agent 222-4 or transaction manager 204-4 not allowing any changes to the Vserver configuration information to occur. Thus, the management kernel agent 222-4 or transaction manager 204-4 may prevent modifications to Vserver configuration information associated with a Vserver (e.g., Vserver 120-1), when cluster nodes 104-1, 104-2, and 104-3 are involved with that Vserver (e.g., Vserver 120-1). Additionally, because cluster nodes 104-1, 104-2, and 104-3 are no longer members of any distributed volume groups, certain transactions will fail if they involve a path via the cluster node 104-4 and requiring a volume hosted, owned, or managed by cluster nodes 104-1, 104-2, and 104-3 (e.g., volumes 116-1, 116-2, and 116-3).

At time $t_{14}$, management kernel agent 222-4 of cluster node 104-4 may leave volume groups for volumes of cluster nodes 104-1, 104-2, and 104-3 and purge workspaces of volume groups for volumes of cluster nodes 104-1, 104-2, and 104-3, as depicted in block 335. For example, the management kernel agent 222-4 may leave volume groups associated with volumes (e.g., volumes 116-1, 116-2, and 116-3) residing on or managed by cluster nodes 104-1, 104-2, and 104-3, respectively. Additionally, the management kernel agent 222-4 may also purge workspaces of the distributed volume groups associated with volumes 116-1, 116-2, and 116-3 so that any configuration information associated with the volumes 116-1, 116-2, and 116-3 may no longer be accessible or stored by cluster node 104-4.

Figure 6D:
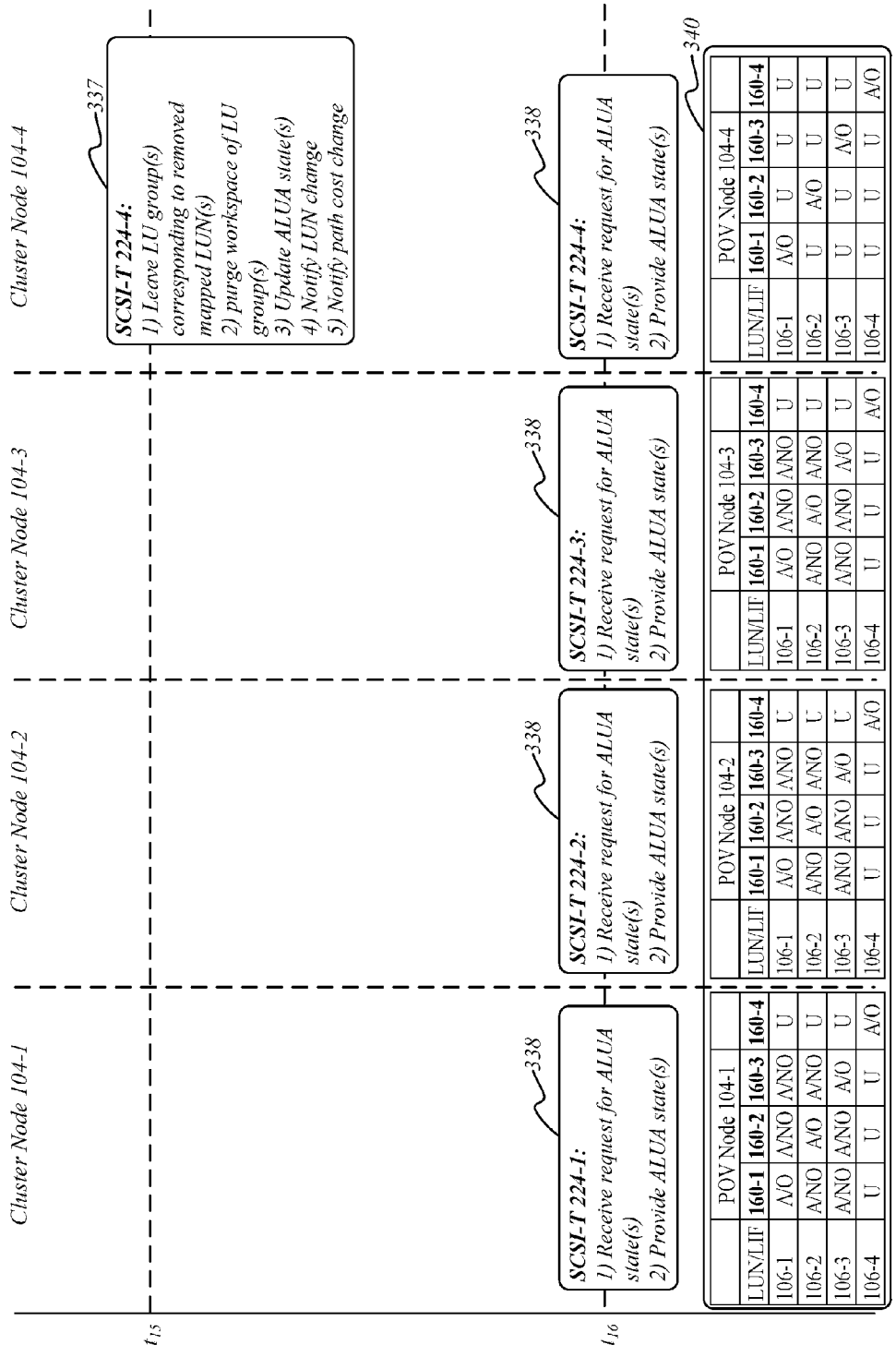
FIG. 6D illustrates another continuation of the operations performed in an operating environment involving the cluster storage sub-system of FIG. 5, according to certain embodiments.

FIG. 6D illustrates another continuation of the embodiment of the operating environment 300 for the cluster storage sub-system 175 starting at time $t_{15}$. At time $t_{15}$, SCSI-T component 224-4 of cluster node 104-4 may perform various operations depicted at block 337. The operations can include leaving logical unit groups corresponding to removed mapped LUNs, purging a workspace of logical unit groups, updating ALUA states, providing notifications of LUN changes, and providing notifications of path status changes.

For example, in response to removed portion of volume configuration information, SCSI-T component 224-4 may leave logical unit groups corresponding to mapped LUNs (e.g., LUNs 106-1, 106-2, and 106-3) removed by management kernel agent 222-1, 222-2, and 222-3 in order to remove access to any LUNs (e.g., LUNs 106-1, 106-2, and 106-3) hosted, owned, or managed by cluster nodes 104-1, 104-2, and 104-3 via LIF 160-4. The SCSI-T component 224-4 may also purge workspace of the distributed logical unit groups corresponding to removed mapped LUNs (e.g., LUN 106-1, 106-2, and 106-3) so that any configuration information associated with the mapped LUNs (e.g., LUNs 106-1, 106-2, and 106-3) may no longer be accessible or stored by cluster nodes 104-1, 104-2, and 104-3. The SCSI-T component 224-4 may further update ALUA access states for LIFs 160-1, 160-2, 160-3, and 160-4 with respect to LUNs 106-1, 106-2, 106-3, and 106-4 based on the quorum status information provided by the cluster quorum manager 206-4 via the event manager 240-4, the volume access state information stored, updated, or provided by the management kernel agent 222-4, or cached volume location information stored, updated, or provided by the respective interface module 228-4. Additionally, SCSI-T component 224-4 may notify the hosts 102-1 to 102-m of a LUN change indicating a LUN inventory update and that one or more LUNs on one or more LIFs has now become not reported using, for example, SCSI protocol (e.g., set U/A to RLDHC on the I_T) as previously discussed. Further, SCSI-T component 224-4 may also notify the hosts 102-1 to 102-m of path status change indicating that one or more ALUA access states has been changed or updated using, for example, SCSI protocol (e.g., set U/A to AASC on I_T_L) as previously discussed.

At time $t_{16}$, cluster nodes 104-1, 104-2, 104-3, and 104-4 may receive request for ALUA states and provide ALUA states, as depicted in blocks 338. For example, cluster nodes 104-1, 104-2, 104-3, and 104-4 may receive requests for updated ALUA access states and provide updated or latest ALUA access states, as illustrated in ALUA access state tables 340. From the perspective of the cluster nodes 104-1, 104-2, and 104-3, all paths remains unchanged (i.e., having state "unavailable" for paths that involve the cluster node 104-4 and any of cluster nodes 104-1, 104-2, and 104-3).

From the perspective of the cluster node 104-4, paths to the LUNs 106-1, 106-2, and 106-3 may be advertised as "unavailable." If access requests to LUNs 106-1, 106-2, and 106-3 through LIF 160-4 are received, the cluster node 104-4 can respond with a message "Not Ready—Unavailable." Additionally, because the cluster node 104-4 has become isolated, the ALUA access states for LIF 160-1, 160-2, and 160-3 from perspective of cluster node 104-4 may advertised as unavailable for LUNs 106-1, 106-2, 1063, and 106-4. Access to LUN 106-4 may no longer be possible from LIF 160-1, 160-2, and 160-3. But a host using an MPIO component 166-1 may still access data or information stored in LUN 160-4 through the LIF 160-4, since this is advertised as an A/O path for LUN 160-4.

Figure 7:
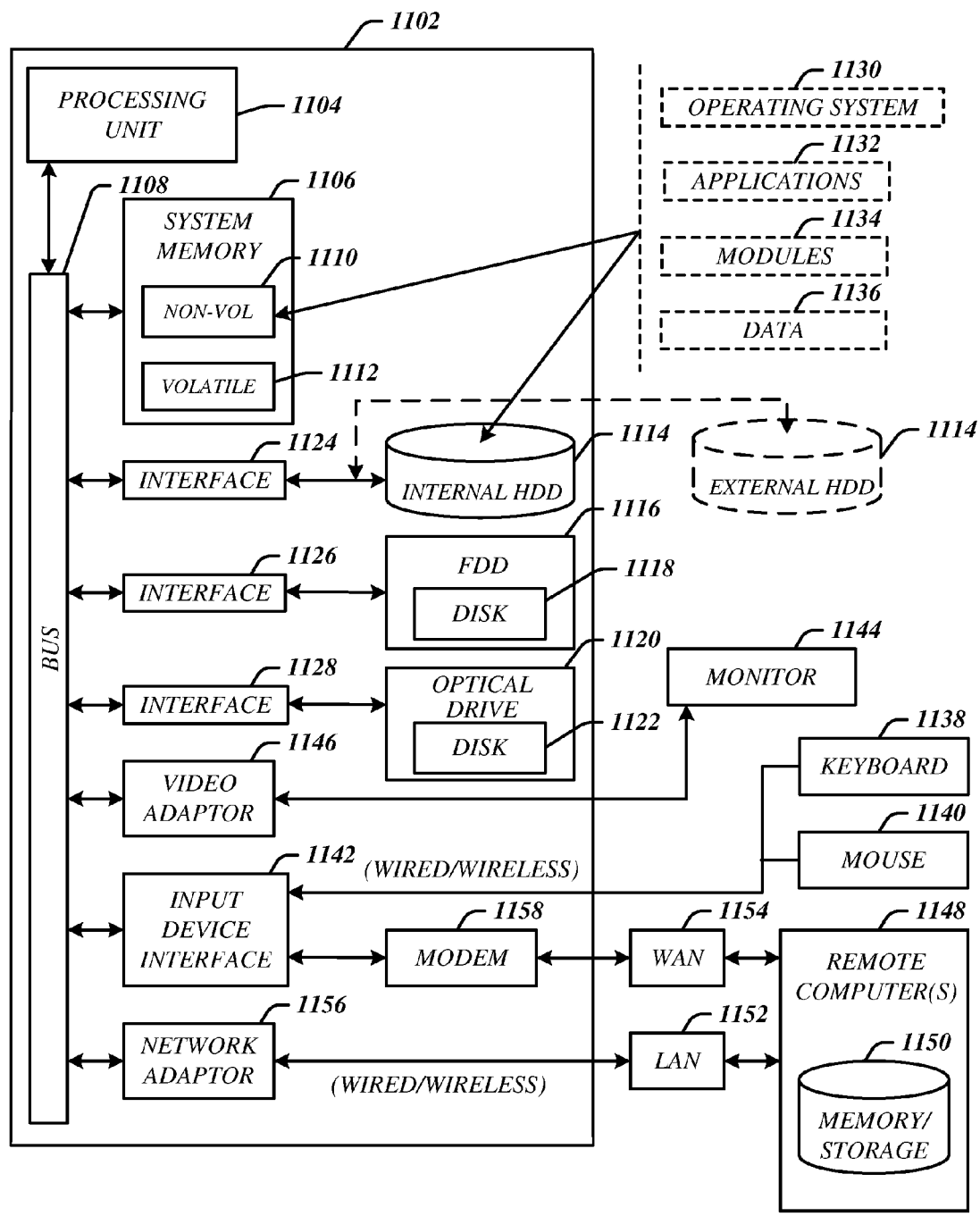
FIG. 7 illustrates an example of a computing architecture, according to certain embodiments.

FIG. 7 illustrates an example of a computing architecture 1100 suitable for implementing some embodiments as previously described. In some embodiments, the computing architecture 1100 can include or be implemented as part of an electronic device. The embodiments are not limited in this context.

As shown in FIG. 7, the computing architecture 1100 includes a processing unit 1104, a system memory 1106, and a system bus 1108. The processing unit 1104 can be any of various suitable processors. Dual microprocessors, multi-core processors, and other multi-processor architectures may also be employed as the processing unit 1104.

The system bus 1108 can provide an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of suitable bus architectures. Interface adapters may connect to the system bus 1108 via a slot architecture. Example slot architectures may include without limitation Accelerated Graphics Port ("AGP"), Card Bus, (Extended) Industry Standard Architecture ("(E) ISA"), Micro Channel Architecture ("MCA"), NuBus, Peripheral Component Interconnect (Extended) ("PCI(X)"), PCI Express, Personal Computer Memory Card International Association ("PCMCIA"), and the like.

The computing architecture 1100 can include or implement various articles of manufacture. An article of manufacture can include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium. These instructions may be read and executed by one or more processors to enable performance of the operations described herein.

The system memory 1106 may include various types of computer-readable storage media in the form of one or more higher speed memory units, such as read-only memory ("ROM"), random-access memory ("RAM"), dynamic RAM ("DRAM"), Double-Data-Rate DRAM ("DDRAM"), synchronous DRAM ("SDRAM"), static RAM ("SRAM"), programmable ROM ("PROM"), erasable programmable ROM ("EPROM"), electrically erasable programmable ROM ("EEPROM"), flash memory, polymer memory such as ferroelectric polymer memory, ovonic memory, phase change or ferroelectric memory, silicon-oxide-nitride-oxide-silicon ("SONOS") memory, magnetic or optical cards, an array of devices such as Redundant Array of Independent Disks ("RAID") drives, solid state memory devices, solid state drives ("SSD"), and any other type of storage media suitable for storing information. In the illustrated embodiment shown in FIG. 7, the system memory 1106 can include non-volatile memory 1110 or volatile memory 1112. A basic I/O system ("BIOS") can be stored in the non-volatile memory 1110.

The computer 1102 may include various types of computer-readable storage media in the form of one or more lower speed memory units, including an internal (or external) hard disk drive ("HDD") 1114, a magnetic floppy disk drive ("FDD") 1116 to read from or write to a removable magnetic disk 1118, and an optical disk drive 1120 to read from or write to a removable optical disk 1122 (e.g., a CD-ROM or DVD). The HDD 1114, FDD 1116, and optical disk drive 1120 can be connected to the system bus 1108 by a HDD interface 1124, an FDD interface 1126, and an optical drive interface 1128, respectively. The HDD interface 1124 for external drive implementations can include at least one or both of Universal Serial Bus ("USB") and IEEE 1394 interface technologies.

The drives and associated computer-readable media provide volatile or nonvolatile storage of data, data structures, computer-executable instructions, and so forth. For example, a number of program modules can be stored in the drives and memory units 1110, 1112, including an operating system 1130 (e.g., a storage operating system), one or more application programs 1132, other program modules 1134, and program data 1136. In some embodiments, the application programs 1132, other program modules 1134, and program data 1136 can include, for example, the various applications or components of the distributed storage environment 100.

A user can enter commands and information into the computer 1102 through one or more wire/wireless input devices, for example, a keyboard 1138 and a pointing device, such as a mouse 1140. Other input devices may include microphones, infra-red remote controls, radio-frequency ("RF") remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth. The computer 1102 may operate in a networked environment using logical connections via wire or wireless communications to one or more remote computers, such as a remote computer 1148. The remote computer 1148 can be a workstation, a server computer, a router, a personal computer, portable computer, microprocessor-based entertainment appliance, a peer device, or other common network node, and typically includes many or all of the elements described relative to the computer 1102, although, for purposes of brevity, only a memory/storage device 1150 is illustrated. The logical connections depicted include wire/wireless connectivity to a local area network ("LAN") 1152 or larger networks, for example, a wide area network ("WAN") 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire or wireless communication network interface or adaptor 1156. The adaptor 1156 can facilitate wire or wireless communications to the LAN 1152, which may also include a wireless access point disposed thereon for communicating with the wireless functionality of the adaptor 1156. When used in a WAN networking environment, the computer 1102 can include a modem 1158, or is connected to a communications server on the WAN 1154, or has other circuitry or devices for establishing communications over the WAN 1154, such as by way of the Internet. The modem 1158, which can be internal or external and a wire or wireless device, connects to the system bus 1108 via the input device interface 1142. In a networked environment, program modules depicted relative to the computer 1102, or portions thereof, can be stored in the remote memory/storage device 1150. The network connections shown are exemplary and other means of establishing a communications link between the computers can be used.

The computer 1102 can communicate with wire and wireless devices or entities using the IEEE 802 family of standards, such as wireless devices operatively disposed in wireless communication (e.g., IEEE 802.11 over-the-air modulation techniques).

As used in this application, the terms "system" and "component" are intended to refer to a computer-related entity, either hardware, a combination of hardware and software, software, or software in execution, examples of which are provided by the computing architecture 1100. For example, a component can be, but is not limited to being, a process running on a processor, a processor, a hard disk drive, multiple storage drives (of optical or magnetic storage medium), an object, an executable, a thread of execution, a program, a program module, an application, an operating system, or a computer. By way of illustration, both an operating system running on a server and the server can be a component. In another illustration, both an application running on cluster node, and the cluster node can also be a component. One or more components can reside within a process or thread of execution, and a component can be localized on one computer or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia I/O (I/O) components, power supplies, and so forth. The embodiments, however, are not limited to implementation by the computing architecture 1100.

General Considerations

With general reference to notations and nomenclature used herein, the embodiments and examples described above may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding, transitioning, updating, associating, disassociating, notifying, determining, providing, receiving, comparing, or the like, which may be commonly associated with mental operations performed by a human operator. However, no such capability of a human operator is necessary, or desirable in most cases, in any of the operations described herein, which form part of one or more embodiments. Rather, these operations are machine operations. Useful machines for performing operations of some embodiments may include, without limitation, general purpose digital computers or similar devices.

Some embodiments also relate to apparatus or systems for performing these operations. This apparatus may be specially constructed for the required purpose or it can include a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in some embodiments" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "that includes" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
notifying, by a first computing device, a host system that a first path through the first computing device to a first resource is optimized and that a second path through a second computing device and an intra-cluster connection between the first computing device and the second computing device to the first resource is non-optimized;
identifying a disruption in the intra-cluster connection, that prevents communication between the first computing device and the second computing node device;
partitioning the second computing device into an active partition with the first computing device excluded from the active partition: and
notifying the host system that the first path is optimized and that the second path is unavailable and continuing input/output operations between the host system and the first resource via the first path during the disruption.

2. The method of claim 1, wherein the second computing device is included in a set of computing devices further comprises:
identifying paths from the first computing device node to the set of computing devices.

3. The method of claim 2, further comprising determining that the set of computing devices is included in the active partition, the identified paths are unavailable during the time period and that other resources previously accessible via the identified paths are owned or managed by the first computing device.

4. The method of claim 2, further comprising:
identifying tasks assigned to at least some of the set of computing devices, wherein the tasks include input/output operations involving other resources that are accessible via the paths and that are owned or managed by the first computing; and
aborting the identified tasks that involve the paths and that are managed by the first computing and notifying the host system.

5. The method of claim 1, further comprising:
during a reboot operation in which the second computing device is available prior to the first computing device, notifying the host system that the second path is unavailable.

6. A non-transitory machine readable medium having stored thereon instructions for managing availability of resources comprising machine executable code which when executed by at least one machine causes the machine to:
notify a host system that a first path through a first computing device to a first resource is optimized and that a second path through a second computing device and an intra-cluster connection between the second computing device and the first computing device to the first resource is non-optimized;
identify a disruption in the intra-cluster connection that prevents communication between the first computing device and the second computing device;
partition the second computing device into an active partition with the first computing device excluded from the active partition; and
notify the host system that the first path is optimized and that the second path is unavailable and continuing input/output operations between the host system and the resource via the first path during the disruption.

7. The non-transitory machine readable medium of claim 6, wherein the second computing device is in a set of computing devices and wherein the machine executable code when executed by the machine further causes the machine to identify paths from the first computing device to the set of computing devices.

8. The non-transitory machine readable medium of claim 7, wherein the machine executable code when executed by the machine further causes the machine to:
determine that the set of computing devices is in the active partition, the identified paths from the first computing device to the set of computing devices are unavailable during the disruption, and that other resources previously accessible via the identified paths are managed by the first computing device.

9. The non-transitory machine readable medium of claim 7, wherein the machine executable code when executed by the machine further causes the machine to:
identify tasks assigned to at least some of the set of computing devices, wherein the tasks include input/output operations involving other resources that are accessible via the paths and that are managed by the first computing; and
abort the identified tasks that involve the paths that are managed by the first computing and notifying the host system.

10. The non-transitory machine readable medium of claim 7, wherein the machine executable code when executed by the machine further causes the machine to:
notify the host system that the second path is unavailable during a reboot operation in which the second computing device is available prior to the first computing device.

11. A computing device, comprising:
a memory containing machine readable medium comprising machine executable code having stored thereon instructions for performing a method of managing multilevel flash storage; and
a processor coupled to the memory, the processor configured to execute the machine executable code to cause the processor to:
notify a host system that a first path through a first computing device to a first resource is optimized and that a second path through a second computing device and an intra-cluster connection between the second computing device and the first computing device to the first resource is non-optimized;

identify a disruption in the intra-cluster connection that prevents communication between the first computing device and the second computing device;

partition the second computing device into an active partition with the first computing device excluded from the active partition; and notify the host system that the first path is optimized and that the second path is unavailable and continuing input/output operations between the host system and the resource via the first path during the disruption.

12. The device of claim 11, wherein the second computing device is in a set of computing devices and wherein the processor is further configured to execute the machine executable code to further cause the processor to identify paths from the first computing device to the set of computing devices.

13. The device of claim 12, wherein the processor is further configured to execute the machine executable code to further cause the processor to:

determine that the set of computing devices is in the active partition, the identified paths from the first computing device to the set of computing devices are unavailable during the disruption, and that other resources previously accessible via the identified paths are managed by the first computing device.

14. The device of claim 12, wherein the processor is further configured to execute the machine executable code to further cause the processor to:

identify tasks assigned to at least some of the set of computing devices, wherein the tasks include input/output operations involving other resources that are accessible via the paths and that are managed by the first computing; and abort the identified tasks that involve the paths that are managed by the first computing and notifying the host system.

15. The device of claim 11, wherein the processor is further configured to execute the machine executable code to further cause the processor to:

notify the host system that the second path is unavailable during a reboot operation in which the second computing device is available prior to the first computing device.

* * * * *